United States Patent
Maeda

(10) Patent No.: US 9,313,363 B2
(45) Date of Patent: Apr. 12, 2016

(54) INFORMATION PROCESSING APPARATUS, CONTROL METHODS, AND STORAGE MEDIUM FOR PRINTING USING SHORT DISTANCE WIRELESS COMMUNICATION

(71) Applicant: CANON KABUSHIKI KAISHA, Tokyo (JP)

(72) Inventor: Masao Maeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/312,094

(22) Filed: Jun. 23, 2014

(65) Prior Publication Data

US 2015/0002892 A1    Jan. 1, 2015

(30) Foreign Application Priority Data

Jun. 28, 2013    (JP) .................................. 2013-137479

(51) Int. Cl.
*G06F 3/12* (2006.01)
*H04N 1/32* (2006.01)
*H04N 1/00* (2006.01)

(52) U.S. Cl.
CPC .......... *H04N 1/32539* (2013.01); *G06F 3/1212* (2013.01); *G06F 3/1236* (2013.01); *G06F 3/1288* (2013.01); *G06F 3/1292* (2013.01); *H04N 1/00106* (2013.01); *H04N 1/00278* (2013.01); *G06F 3/1204* (2013.01); *G06F 3/1217* (2013.01); *G06F 3/1294* (2013.01); *G06F 3/1296* (2013.01); *H04N 2201/006* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,745,607 A | 4/1998 | Maeda | 382/240 |
| 6,546,052 B1 | 4/2003 | Maeda et al. | 375/240.08 |
| 8,244,917 B2 | 8/2012 | Takayama et al. | 710/1 |
| 2009/0036056 A1* | 2/2009 | Oshima et al. | 455/41.3 |
| 2010/0069008 A1* | 3/2010 | Oshima et al. | 455/41.3 |
| 2011/0292445 A1* | 12/2011 | Kato | 358/1.15 |
| 2012/0243038 A1* | 9/2012 | Saeda | 358/1.15 |
| 2012/0258662 A1 | 10/2012 | Takayama et al. | 455/41.1 |
| 2013/0027741 A1* | 1/2013 | Liu | 358/1.15 |
| 2013/0094047 A1* | 4/2013 | Bailey et al. | 358/1.14 |
| 2014/0153017 A1* | 6/2014 | Watanabe et al. | 358/1.13 |
| 2014/0240774 A1* | 8/2014 | Suzuki | 358/1.15 |
| 2015/0277823 A1* | 10/2015 | Nakayama | G03G 15/5087 358/1.14 |

FOREIGN PATENT DOCUMENTS

JP    2004-364145 A    12/2004

* cited by examiner

*Primary Examiner* — Miya J Cato
(74) *Attorney, Agent, or Firm* — Fitzpatrick, Cella, Harper & Scinto

(57) ABSTRACT

The invention allows a terminal apparatus to immediately execute print job transmission even if it is impossible to execute a direct print job by a handover. When, therefore, a mobile phone functioning as a mobile terminal performs short distance wireless communication with a printing apparatus, it receives information about peer-to-peer communication via a wireless LAN and information indicating whether the printing apparatus currently executes printing. If it is determined that another user is already executing printing, the mobile phone connects to a mobile telephone line network, and transmits a print job to a printing server for transmitting a print job to the printing apparatus.

25 Claims, 26 Drawing Sheets

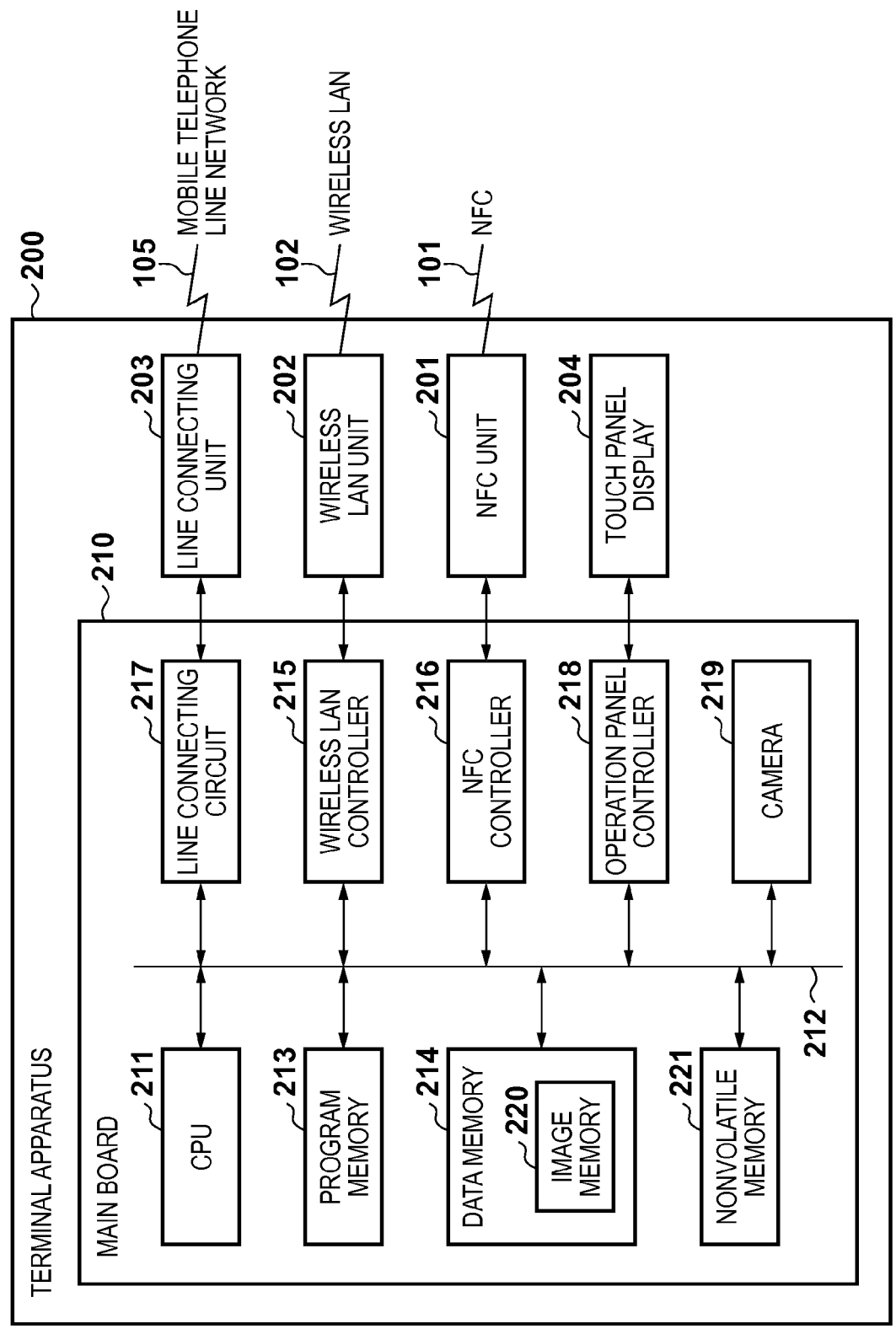

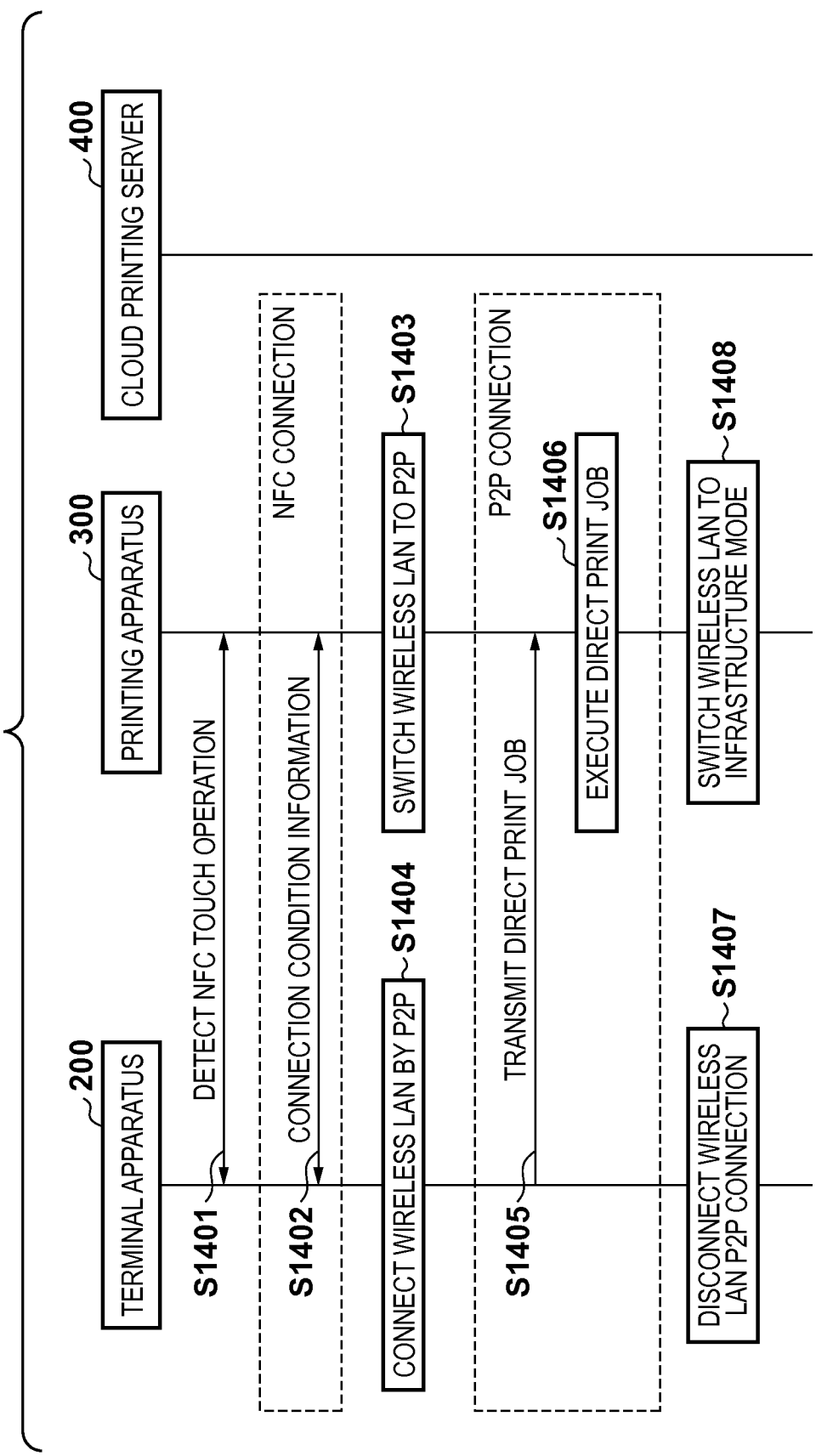

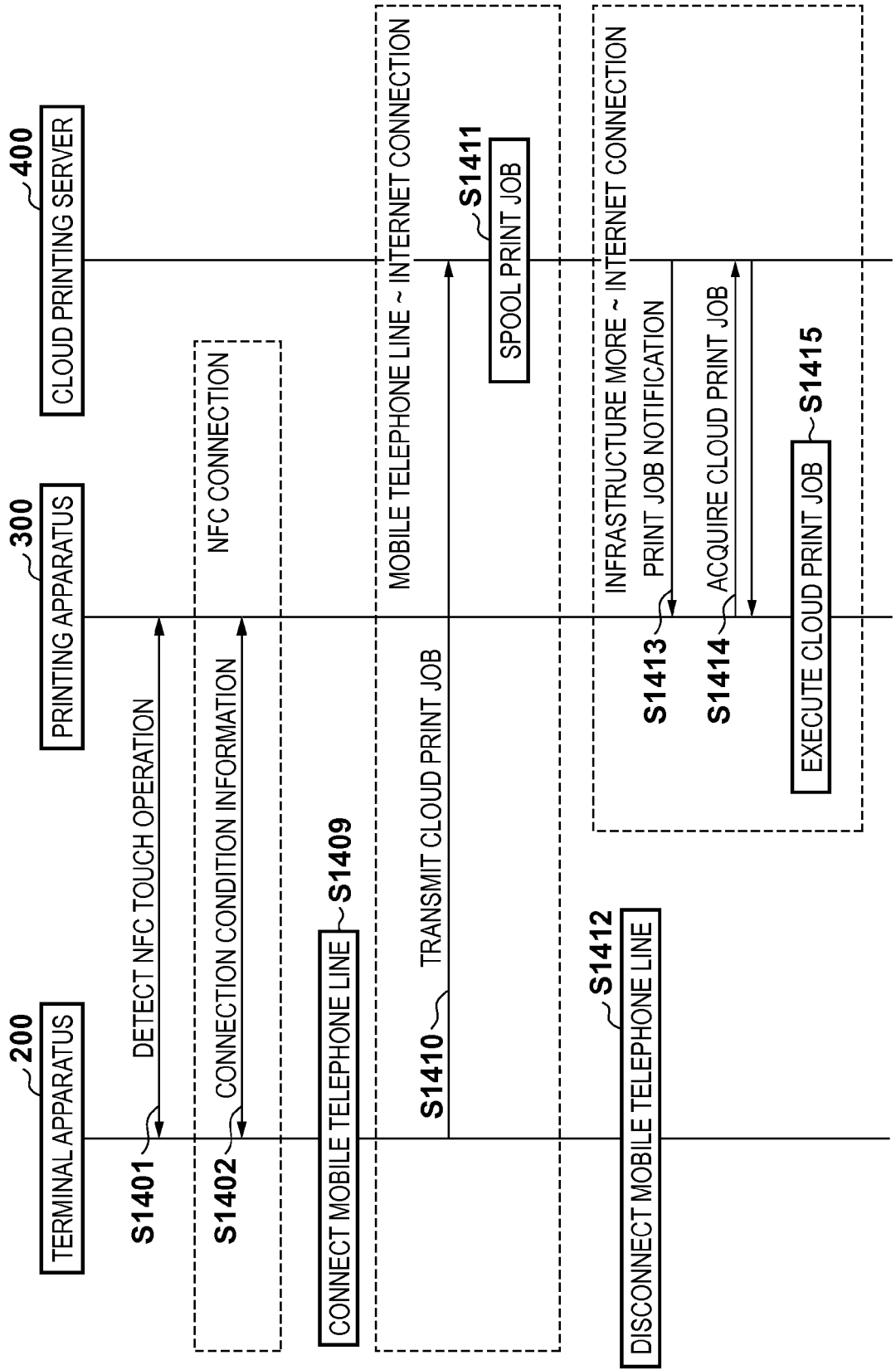

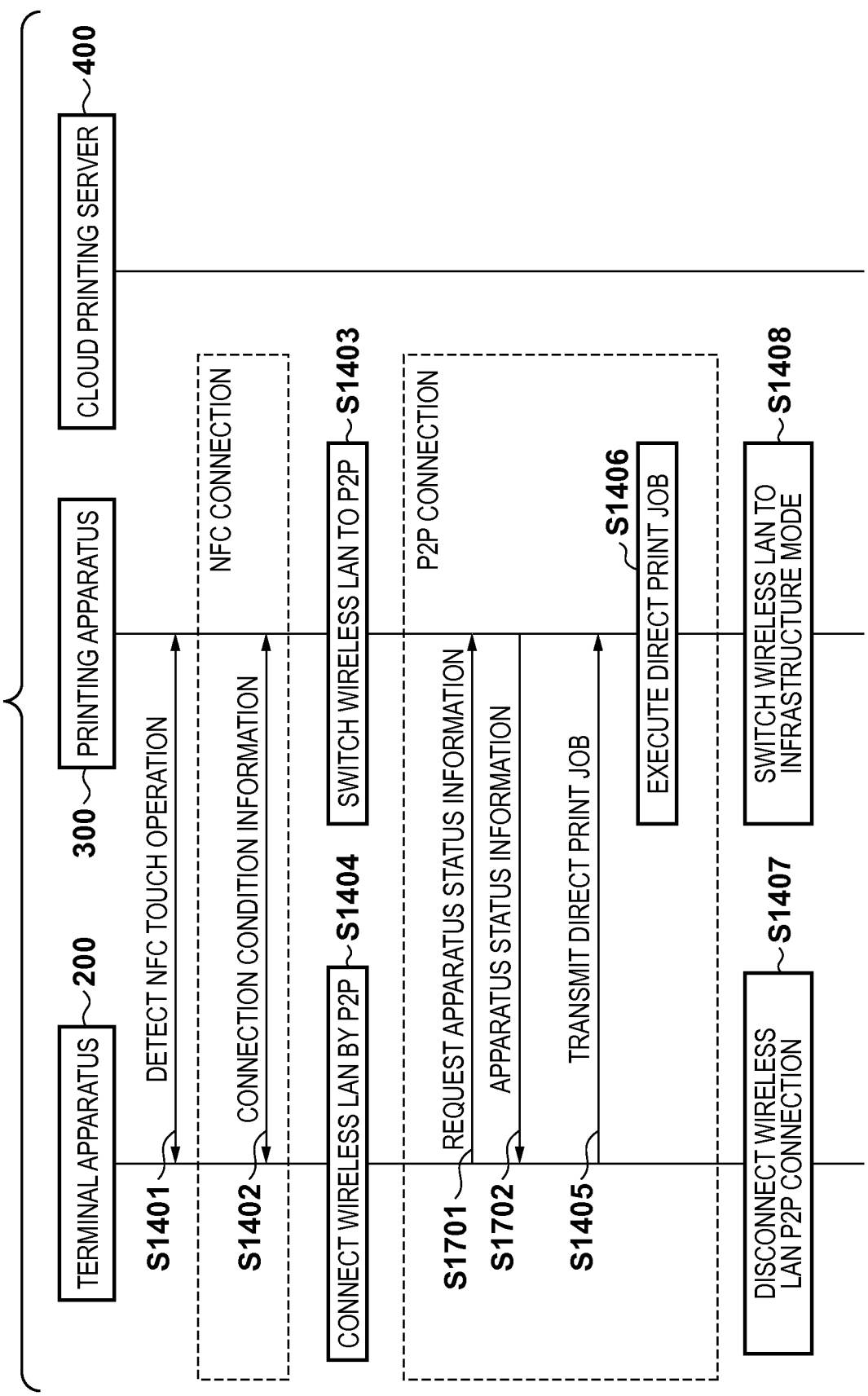

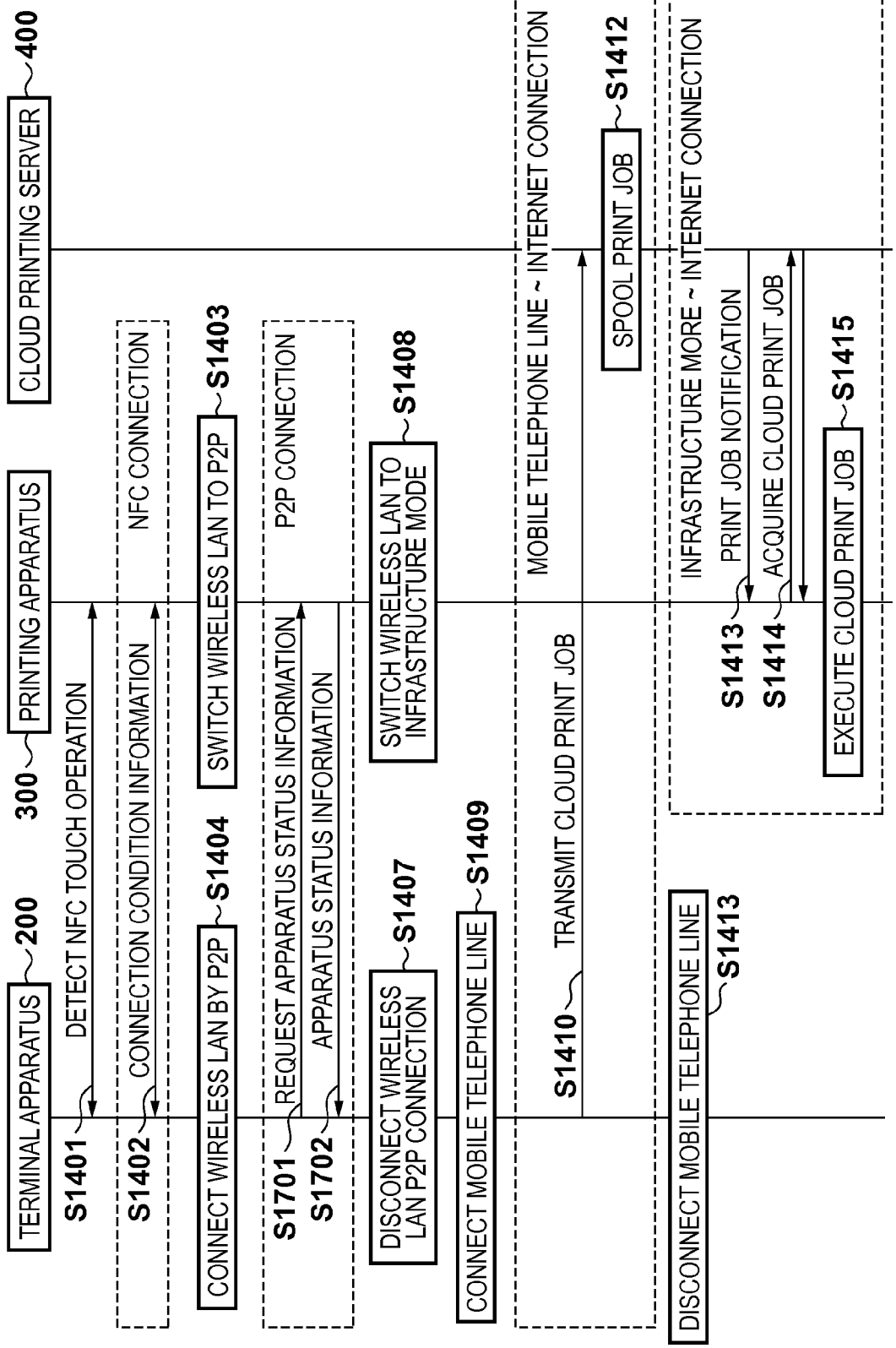

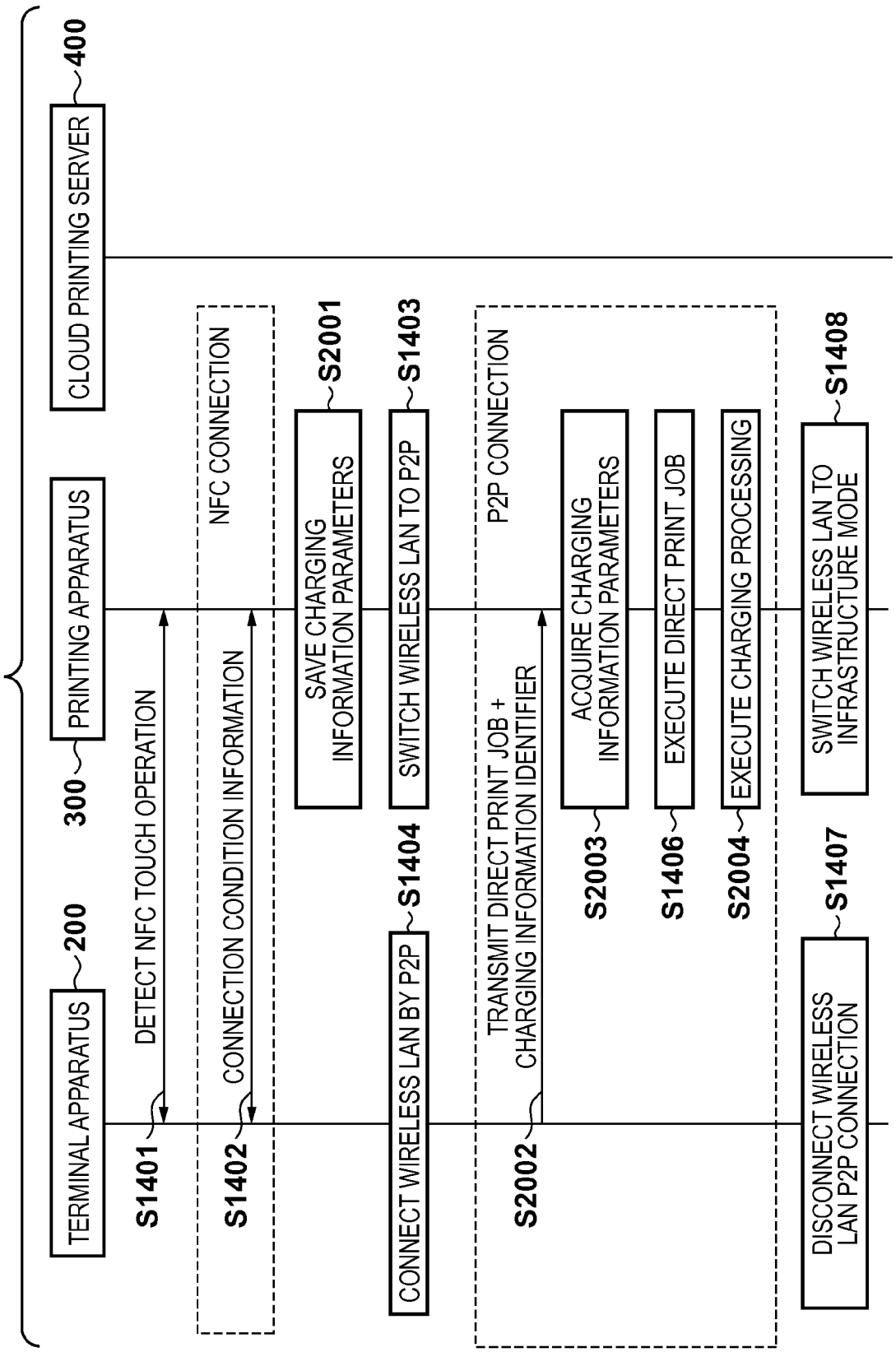

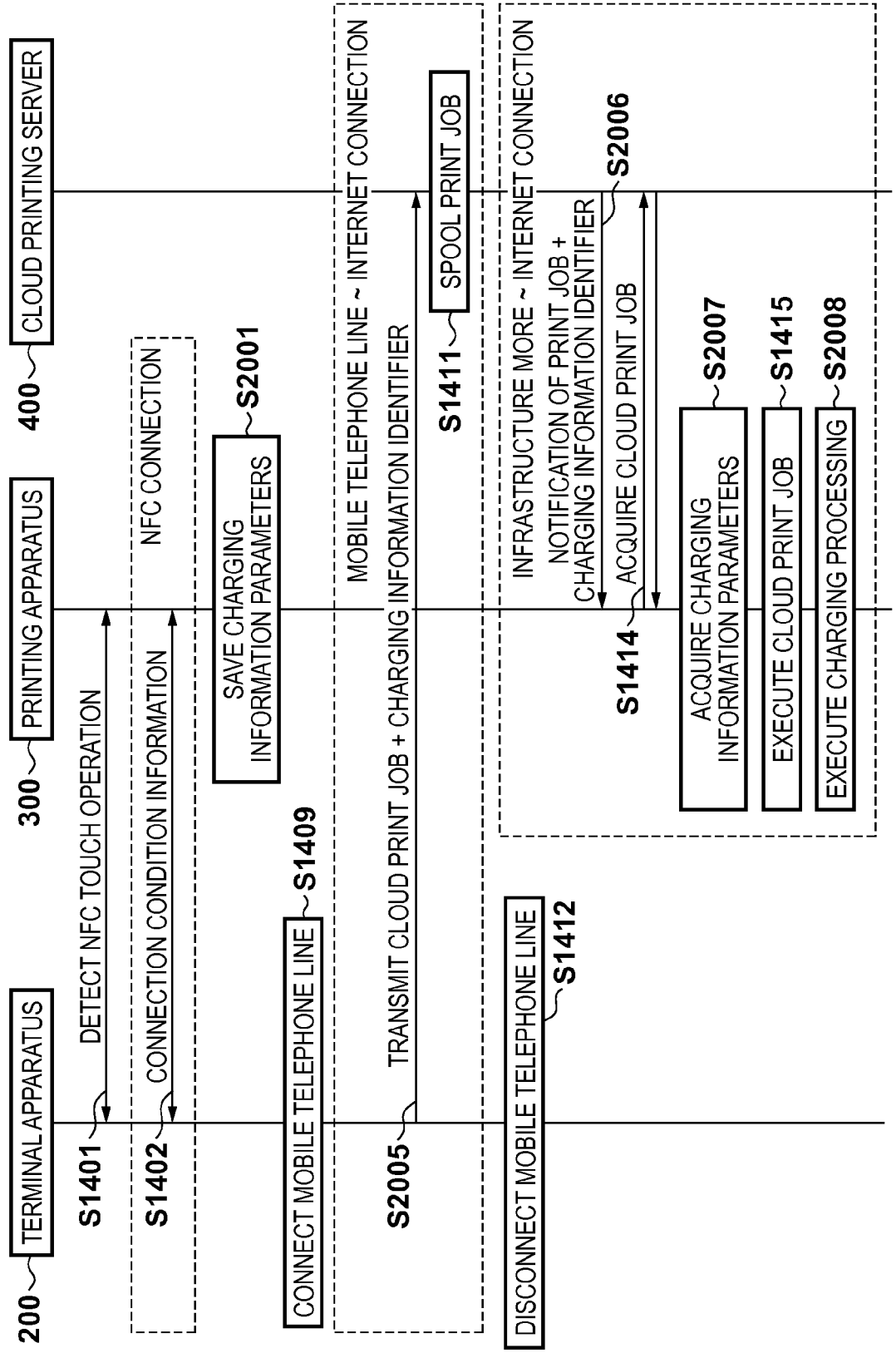

F I G. 18
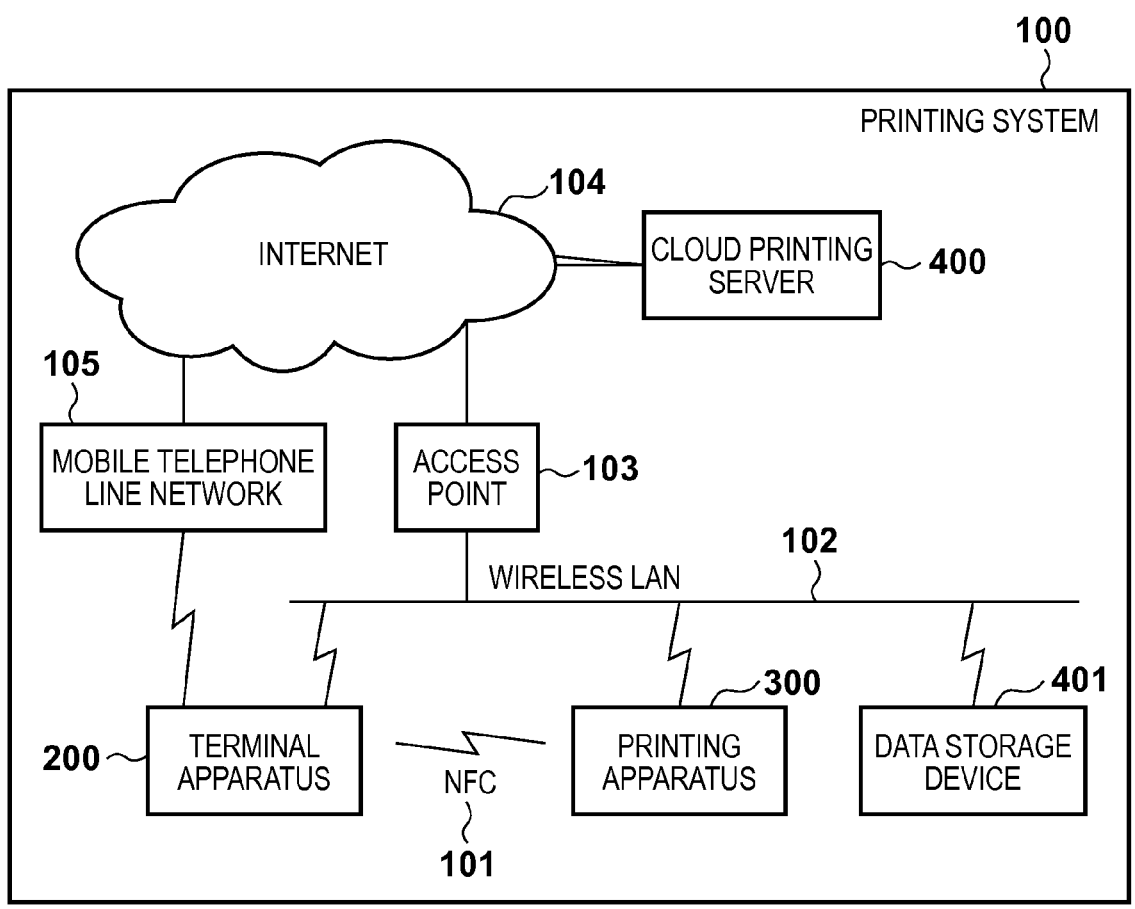

F I G. 19
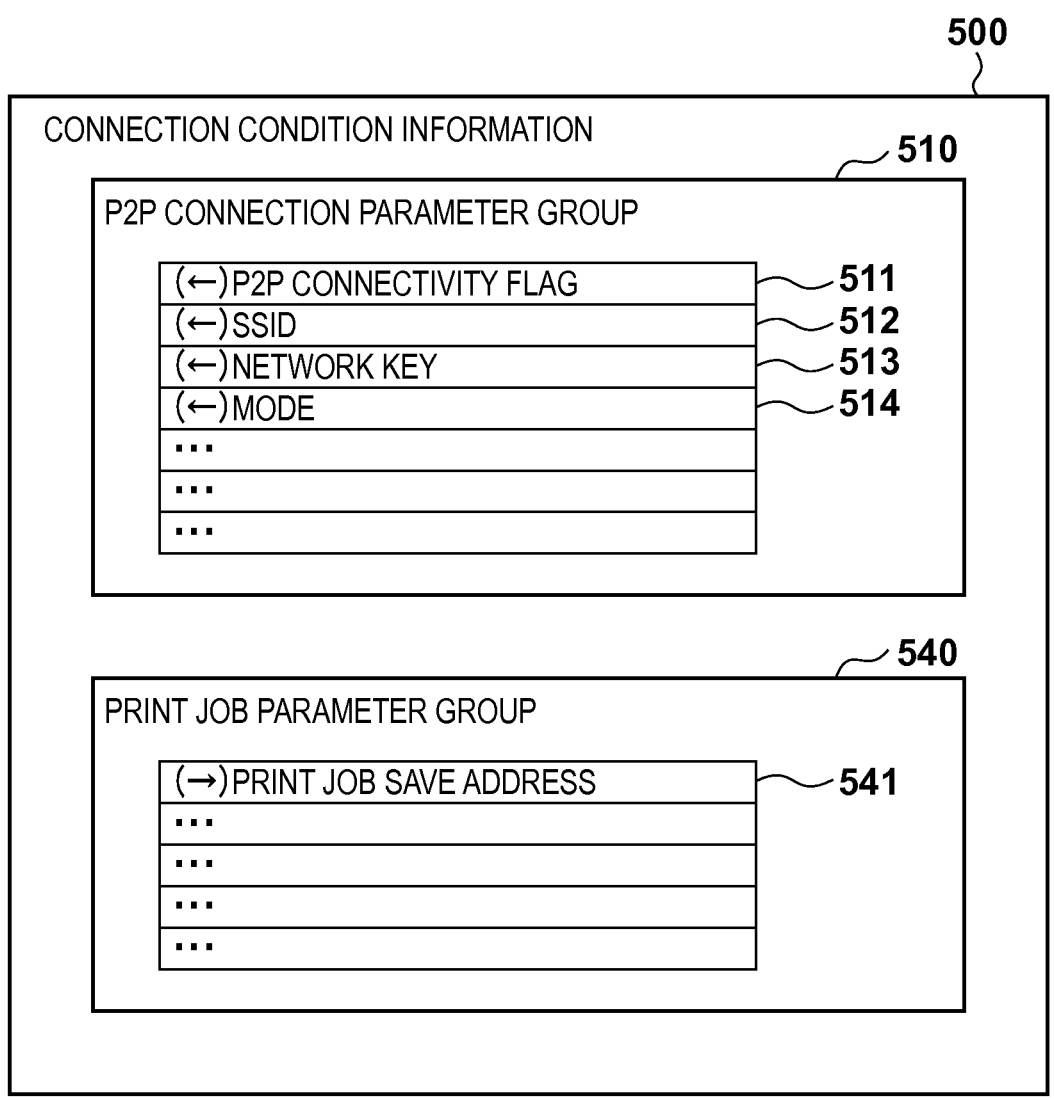

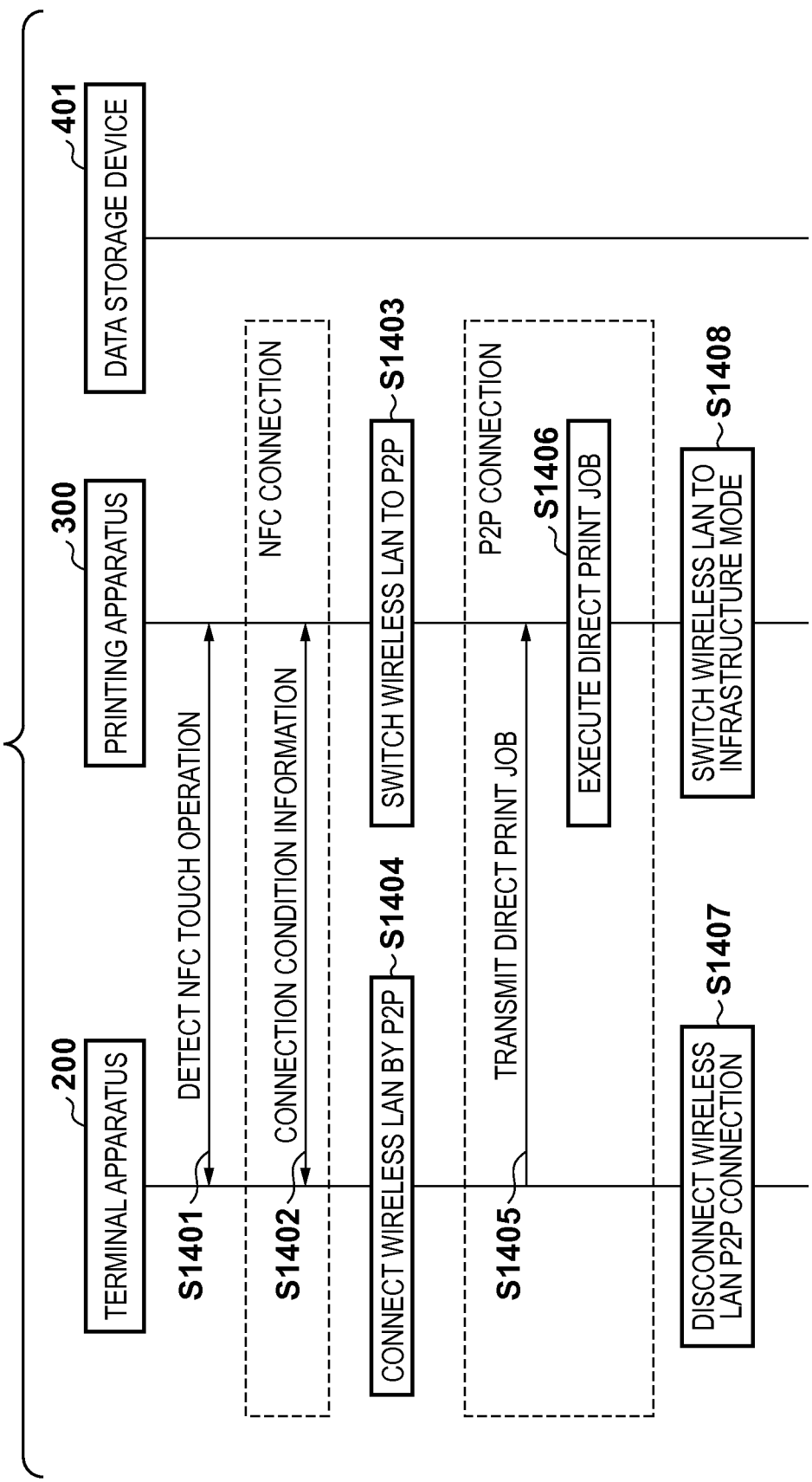

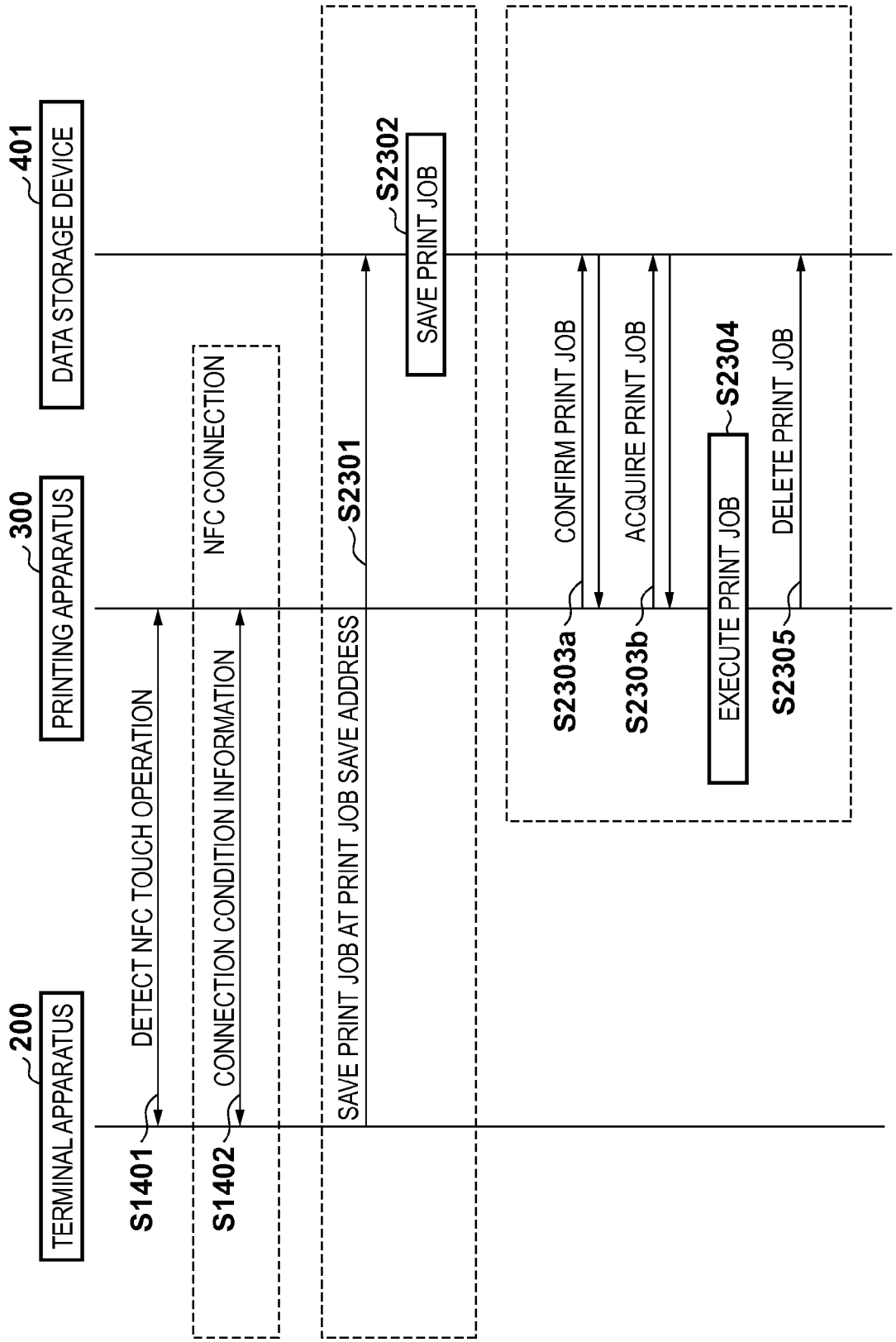

INFORMATION PROCESSING APPARATUS, CONTROL METHODS, AND STORAGE MEDIUM FOR PRINTING USING SHORT DISTANCE WIRELESS COMMUNICATION

BACKGROUND OF THE INVENTION

1. Field of the Invention

The present invention relates to a printing technique using short distance wireless communication (for example, Near Field Communication).

2. Description of the Related Art

Conventional printing apparatuses have an arrangement to receive a print job from a host apparatus such as a personal computer, and executing printing. To do this in a wireless network environment, in many cases, a printing apparatus and a host apparatus connect to the same access point to transmit/receive a print job. To the contrary, since recent terminal apparatuses such as mobile phones and smartphones have rapidly become widespread, various different printing methods have been proposed. One of the new printing methods is a so-called cloud print mode in which a terminal apparatus transmits a print job to an external cloud printing server via the Internet, and a printing apparatus receives the print job from the cloud printing server to execute printing. According to the cloud print mode, a remote terminal apparatus which is not connected to an access point connected to a printing apparatus or a terminal apparatus which is connected to a mobile telephone line network can readily transmit a print job. Another new printing method is direct printing in which a terminal apparatus and a printing apparatus are directly connected via a wireless network, and transmit and receive a print job to execute printing. In direct printing, a terminal apparatus can discover a nearby printing apparatus, connect to the printing apparatus, and send a print job, thereby executing printing. To implement direct printing, various protocols such as a discovery protocol for discovering an apparatus and a negotiation protocol for establishing a connection for transmission/reception of information have been proposed and put into practice. Direct printing, however, often requires a printing apparatus and terminal apparatus to connect to a wireless network environment. To set the apparatuses in a communicable status by inputting connection conditions, appropriate knowledge and labor are required. Furthermore, a terminal apparatus side needs to select a printing apparatus to execute printing. If a plurality of printing apparatuses are arranged in a network environment, it is difficult to specify a printing apparatus as a desired output destination.

To solve this problem, for example, Japanese Patent Laid-Open No. 2004-364145 (to be referred to as patent literature 1 hereinafter) discloses a so-called handover technique in which a short distance wireless communication unit is provided in each of a terminal apparatus and a printing apparatus, and the terminal apparatus and the printing apparatus transfer communication conditions by short distance wireless communication in order to switch to a high-speed wireless network connection.

In the technique described in patent literature 1, however, if a printing apparatus is already connected to another terminal apparatus by a handover, a new terminal apparatus may not be able to connect to the printing apparatus by a handover depending on the type of direct printing.

When, for example, executing direct printing by performing wireless network connection in an ad hoc mode, a printing apparatus can be connected to only one terminal apparatus. If the printing apparatus is already connected to another apparatus in the ad hoc mode, it cannot be connected to a new terminal apparatus. The printing apparatus can operate as an access point, and a plurality of terminal apparatuses can be connected to the printing apparatus serving as an access point via the wireless network. To simultaneously communicate with the plurality of apparatuses, the printing apparatus is required to have a more advanced hardware arrangement, resulting in a higher apparatus cost. A practical example of the arrangement in which a printing apparatus operates as an access point is defined by the Wi-Fi Direct standard. According to this standard, when a printing apparatus serves as an access point, communication conditions such as an SSID are newly set, and a terminal apparatus is notified of the communication conditions and connected to the printing apparatus based on the WPS standard. In general, a printing apparatus operating in an infrastructure mode in a wireless network switches the mode to a Wi-Fi Direct mode by a handover which is caused by short distance wireless communication. That is, since it is necessary to newly set communication conditions every time an apparatus switches to the Wi-Fi Direct mode by a handover, it is more difficult to simultaneously connect a plurality of terminal apparatuses in response to their handover requests. Alternatively, assume that a plurality of terminal apparatuses can be connected to the wireless network. In this case, if the terminal apparatuses can be connected to each other, a security problem may arise and, therefore, it may be required to prohibit simultaneous connection of a plurality of terminal apparatuses. Furthermore, even if a printing apparatus and a terminal apparatus can be directly connected by a handover, the printing apparatus may not be able to receive a print job from the terminal apparatus while a print job from another terminal apparatus is in progress. Especially a low-cost printing apparatus has a small memory capacity for storing received print jobs. It is, therefore, difficult to configure such printing apparatus to simultaneously receive print jobs from a plurality of terminal apparatuses.

When it is impossible to execute direct printing by a handover as described above, a terminal apparatus which attempts to be connected later cannot transmit its own print job and needs to stand by until a print job in progress ends. During the standby time, the terminal apparatus side cannot perform another operation, and consumes its battery, thereby impairing the usability.

SUMMARY OF THE INVENTION

The present invention has been made to solve the above-described problems, and provides a technique in which even if it is impossible to execute a direct print job by a handover, a terminal apparatus can immediately execute print job transmission.

To achieve the above object, for example, there is provided an information processing apparatus for controlling a plurality of communication units including a first communication unit configured to perform short distance wireless communication, comprising: an acquisition unit configured to acquire information for communicating, via a second communication unit different from the first communication unit, with a device for executing predetermined processing; a transmission unit configured to communicate with the device via the second communication unit in accordance with the information acquired by the acquisition unit, and transmit a job to execute the predetermined processing to the apparatus; a determination unit configured to determine whether the device is in a status in which it is possible to execute the predetermined processing; and a control unit configured to, in a case where a determination result of the determination unit indicates the status in which it is possible to execute the predetermined processing, cause the transmission unit to transmit the job to the device, and in a case where the determination result of the determination unit does not indicate the status in which it is possible to execute the predetermined processing, transmit, via a communication unit other than the first communication unit, the job to another predetermined apparatus for supplying a job to the device.

According to the present invention, even if it is impossible to execute a direct print job by a handover, a terminal apparatus can immediately execute print job transmission.

Further features of the present invention will become apparent from the following description of exemplary embodiments (with reference to the attached drawings).

BRIEF DESCRIPTION OF THE DRAWINGS

FIG. 4 is a block diagram showing the arrangement of the terminal apparatus;

FIGS. 9A and 9B are sequence charts each showing a sequence when the terminal apparatus transmits a print job and the printing apparatus executes printing;

FIGS. 13A and 13B are sequence charts each showing a sequence when the terminal apparatus transmits a print job and the printing apparatus executes printing;

FIGS. 17A and 17B are sequence charts each showing a sequence when the terminal apparatus transmits a print job and the printing apparatus executes printing according to the third embodiment;

FIG. 18 is a view showing the configuration of a printing system according to the fourth embodiment;

FIG. 19 is a view showing contents of connection condition information transmitted/received between a printing apparatus and a terminal apparatus via an NFC connection;

FIGS. 22A and 22B are sequence charts each showing a sequence when the terminal apparatus transmits a print job and the printing apparatus executes printing.

DESCRIPTION OF THE EMBODIMENTS

Embodiments of the present invention will be described in detail below. Note that components set forth in the embodiments are merely an example of the present invention, and do not intend to limit the scope of the invention to them.

First Embodiment

Figure 1:
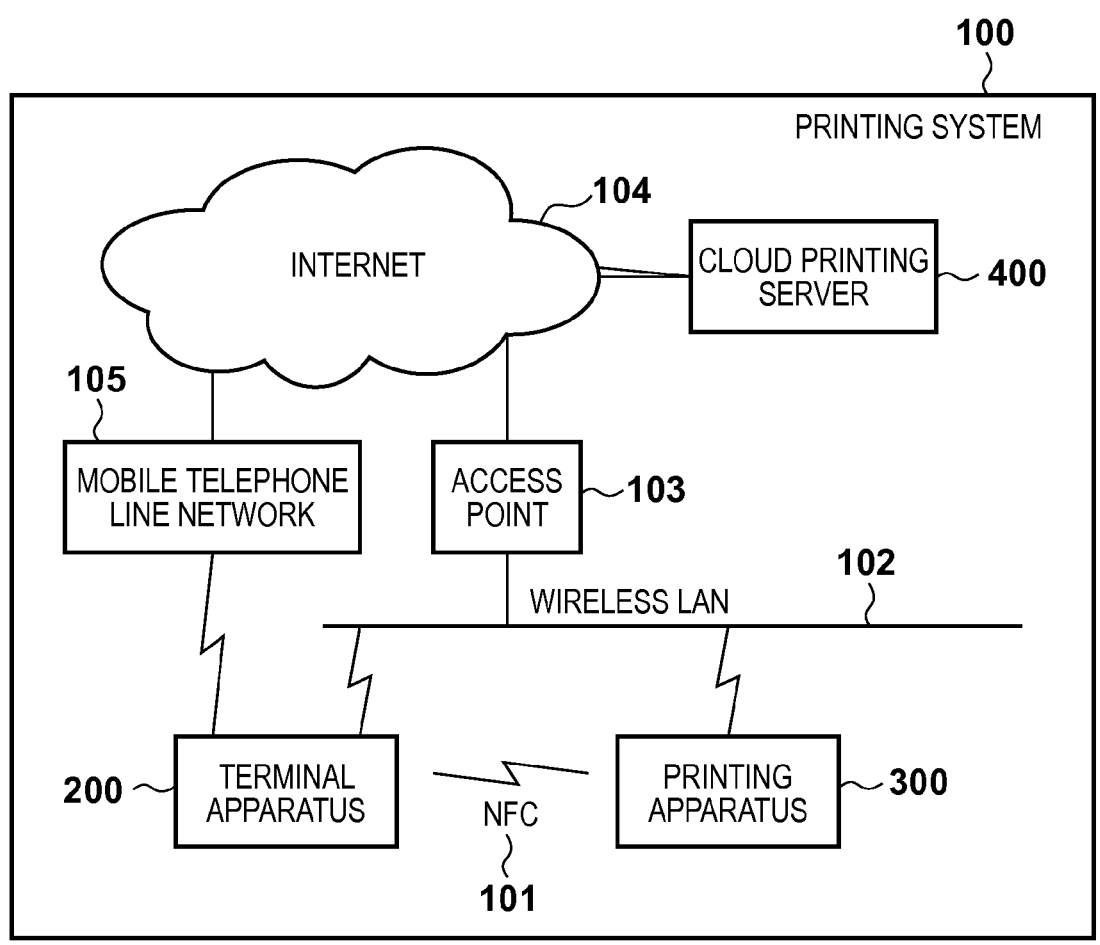
FIG. 1 is a view showing the configuration of a printing system 100 according to an embodiment of the preset invention.

FIG. 1 is a view showing the configuration of a printing system 100 according the embodiment. A terminal apparatus (or mobile terminal) 200 and a printing apparatus 300 can communicate with each other by short distance wireless communication 101 such as NFC (Near Field Communication). The terminal apparatus 200 and the printing apparatus 300 can be interconnected via a wireless LAN 102 or an access point 103. The access point 103 has a router function, and is externally connected to the Internet 104. The terminal apparatus 200 and the printing apparatus 300 can also communicate with a cloud printing server 400 on the Internet 104. The terminal apparatus 200 is also connected to a mobile telephone line network 105 different from the wireless LAN 102. The terminal apparatus 200 can be connected to the cloud printing server 400 via the mobile telephone line network 105. Note that this arrangement is merely an example of the present invention. Even if the apparatus has a different arrangement, it is possible to obtain the same effects of the present invention. Although, for example, a case in which the access point 103 has the router function has been described, a router apparatus may be formed as an apparatus separated from the access point 103. Furthermore, although a case in which the terminal apparatus 200 can be connected to the Internet 104 via the access point 103 through the wireless LAN 102 has been explained, the terminal apparatus 200 may be configured to be communicable with only the printing apparatus 300 via the wireless LAN 102. In this case, the terminal apparatus 200 is configured to be communicable with the Internet 104 and the cloud printing server 400 only via the mobile telephone line network 105.

Figure 2:
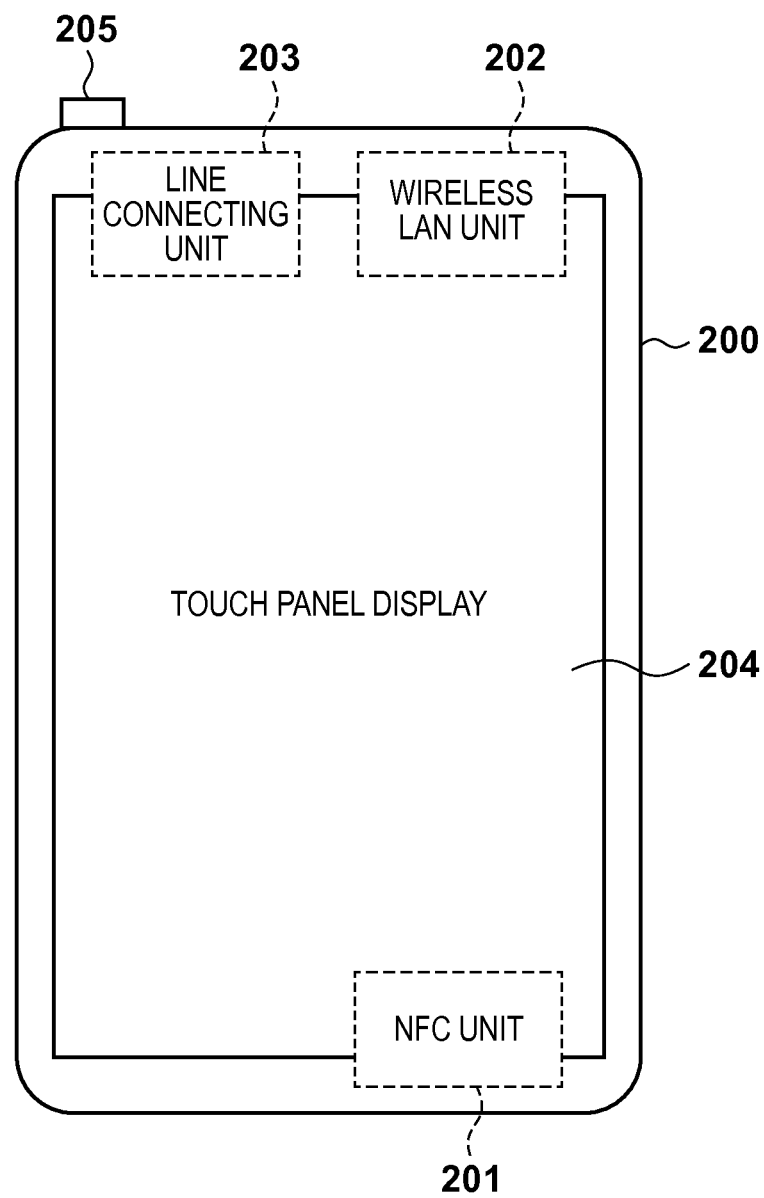
FIG. 2 is a view showing the outer appearance of a terminal apparatus.

FIG. 2 is a perspective view showing the outer appearance of the terminal apparatus 200. In this embodiment, a smartphone will be exemplified. The smartphone indicates a multifunction mobile phone which incorporates a camera, network browser, email function, and the like in addition to functions of a mobile phone. An NFC unit 201 is a unit for performing short distance wireless communication using NFC. When the user actually brings the NFC unit 201 closer to a partner NFC unit within about 10 cm, the NFC units can communicate with each other. A wireless LAN unit 202 is a unit used to perform communication via the wireless LAN 102, and is arranged within the apparatus. A line connecting unit 203 is a unit used to perform communication by connecting to a mobile telephone line, and is arranged within the apparatus. A touch panel display 204 has an LCD display mechanism and a touch panel operation mechanism, and is provided on the front surface of the terminal apparatus 200. As a representative operation method, the touch panel display 204 displays button-like operation parts, and the user performs a touch operation on the touch panel display 204, thus issuing a button pressing event. A power key 205 is used to turn on/off the power of the terminal apparatus.

Figure 3A:
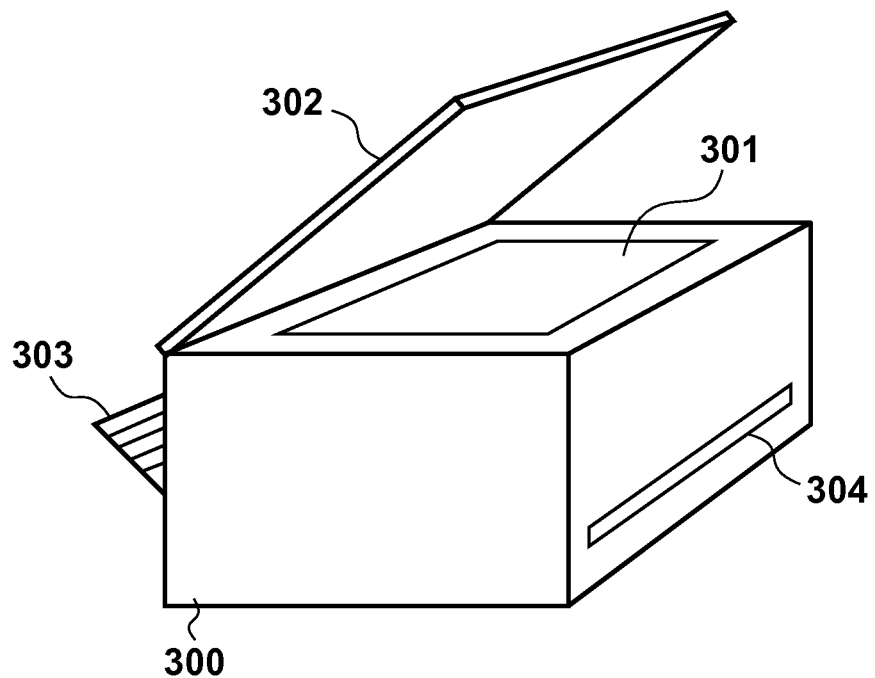
FIG. 3A is a perspective view showing the outer appearance of a printing apparatus.
Figure 3B:
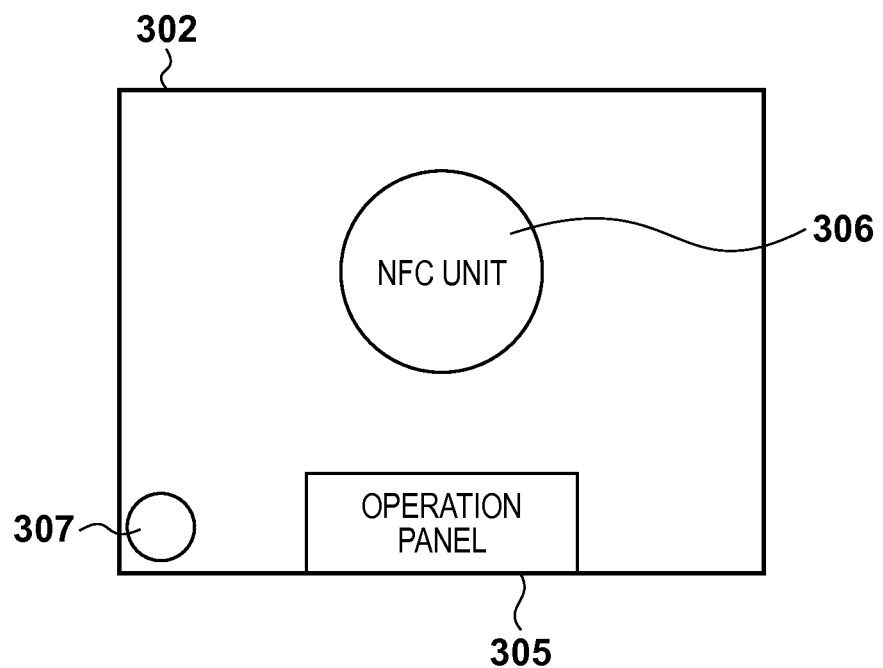
FIG. 3B is a plan view showing the printing apparatus.

FIG. 3A is a perspective view showing the outer appearance of the printing apparatus 300. In this embodiment, a multi-function printer (MFP) which is a printing apparatus incorporating a scanner and other functions will be exemplified. An original table 301 is a glass-like transparent table which is used to read an original placed on it by the scanner. An original cover plate 302 is a cover used to press an original against the original table and prevent external light from entering a scanner unit at the time of reading by the scanner. A printing paper insertion port 303 is an insertion port on which paper sheets of various sizes are set. Paper sheets set on the printing paper insertion port 303 are conveyed one by one to a printing unit, and are discharged from a printing paper discharge port 304 after desired printing is performed. FIG. 3B is a plan view showing the outer appearance of the printing apparatus 300. An operation panel 305 and an NFC unit 306 are arranged on the upper portion of the original cover plate 302. The NFC unit 306 is a unit used to perform short distance wireless communication. It is possible to perform communication by actually bringing the NFC unit of a communication partner closer to the NFC unit 306 of the printing apparatus within about 10 cm. A wireless LAN antenna 307 is an antenna which is used to perform communication via the wireless LAN 102, and is embedded in the printing apparatus.

FIG. 4 is a block diagram showing the arrangement of the terminal apparatus 200. The terminal apparatus 200 includes a main board 210 for controlling the overall apparatus, a wireless LAN unit 202, an NFC unit 201, and a line connecting unit 203. A CPU 211 in the form of a microprocessor arranged in the main board 210 operates in accordance with control programs stored in a program memory 213 in the form of a ROM and contents of a data memory 214 in the form of a RAM, which are connected via an internal bus 212. The CPU 211 controls the wireless LAN unit 202 via a wireless LAN controller 215, thereby communicating with another communication terminal apparatus via the wireless LAN 102. By controlling the NFC unit 201 via an NFC controller 216, the CPU 211 can detect a connection to another NFC terminal, and transmit/receive data to/from another NFC terminal. Furthermore, by controlling the line connecting unit 203 via a line connecting circuit 217, the CPU 211 can connect to the mobile telephone line network to make a call and transmit/receive data. By controlling an operation panel controller 218, the CPU 211 can perform a desired display operation on the touch panel display 204, and accept an operation from the user. The CPU 211 can control a camera unit 219 to capture an image, and store the captured image in an image memory 220 of the data memory 214. In addition to the captured image, the CPU 211 can store an image externally acquired via the mobile telephone line, the wireless LAN 102, or the NFC connection 101 in the image memory 220, or externally transmit an image.

A nonvolatile memory 221 is implemented by a flash memory or the like, and stores data to be saved even after power-off. In addition to, for example, address book data, various kinds of communication connection information, and information about devices connected in the past, the nonvolatile memory 221 stores image data to be saved, application software for implementing various functions in the terminal apparatus 200, and the like.

Figure 5:
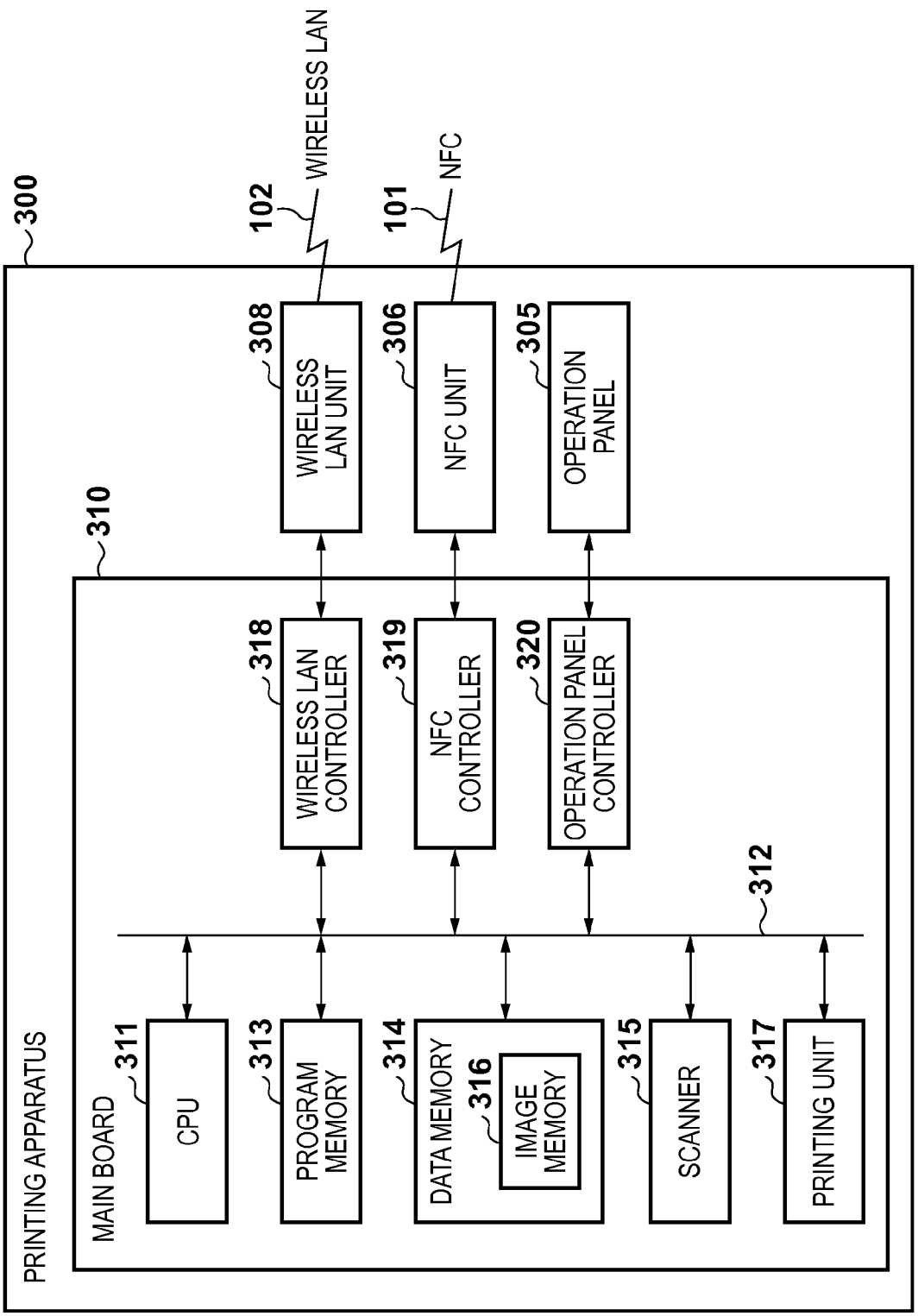
FIG. 5 is a block diagram showing the arrangement of the printing apparatus.

FIG. 5 is a block diagram showing the arrangement of the printing apparatus 300. The printing apparatus 300 includes a main board 310 for controlling the overall apparatus, a wireless LAN unit 308, and an NFC unit 306. A CPU 311 in the form of a microprocessor arranged in the main board 310 executes various kinds of processing associated with print control in accordance with control programs stored in a program memory 313 in the form of a ROM and contents of a data memory 314 in the form of a RAM, which are connected via an internal bus 312. The CPU 311 controls a scanner unit 315 to read an original, and stores the read data in an image memory 316 of the data memory 314. The CPU 311 can control a printing unit 317 to print an image in the image memory 316 of the data memory 314 on a printing medium. By controlling the wireless LAN unit 308 via a wireless LAN communication controller 318, the CPU 311 communicates with another communication terminal apparatus via the wireless LAN 102. Furthermore, by controlling the NFC unit 306 via an NFC controller 319, the CPU 311 can detect a connection to another NFC terminal, and transmit/receive data to/from another NFC terminal. By controlling an operation panel controller 320, the CPU 311 can display the status of the printing apparatus and a function selection menu on the operation panel 305, and accept an operation from the user.

An operation of bringing the NFC unit 201 of the terminal apparatus 200 and the NFC unit 306 of the printing apparatus 300 closer to each other will be referred to as an "NFC touch operation" hereinafter.

In this embodiment, a use case will be described in which after the user selects an image to be printed by operating the terminal apparatus 200, he/she prints the desired image by the desired printing apparatus 300 by performing an NFC touch operation for the printing apparatus 300 to be used for printing.

Figure 6:
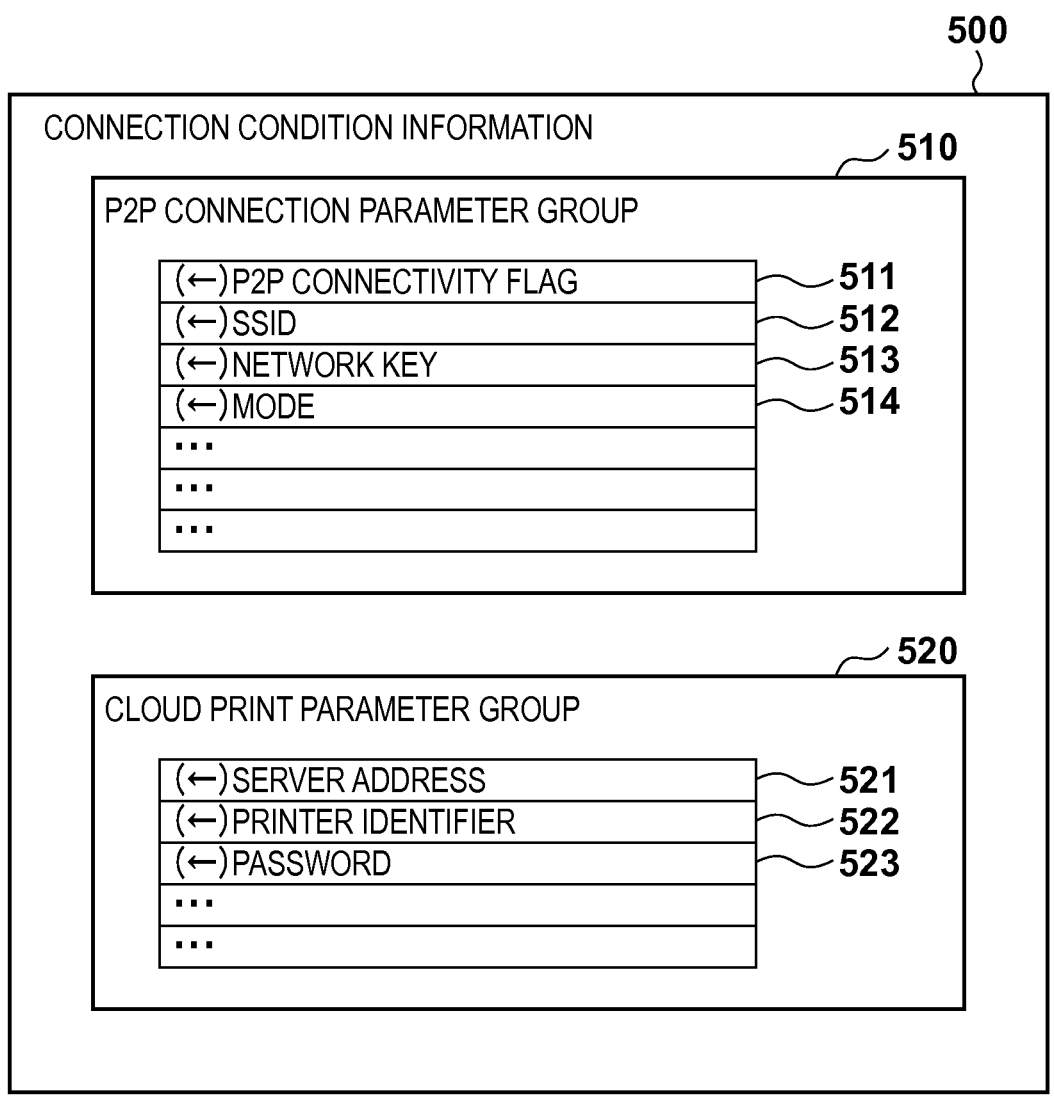
FIG. 6 is a view showing contents of connection condition information 500 transmitted/received via an NFC connection 101.

FIG. 6 is a view showing contents of connection condition information 500 transmitted/received between the printing apparatus 300 and the terminal apparatus 200 via the NFC connection 101. An arrow shown on the left side of each parameter indicates the source and destination of information. That is, for an item with a left arrow, the printing apparatus 300 serves as a source and the terminal apparatus 200 serves as a destination via the NFC connection 101. An item with a right arrow is supplied from the terminal apparatus 200 to the printing apparatus 300 via the NFC connection 101. In this embodiment, all items are transferred from the printing apparatus 300 to the terminal apparatus 200. The present invention, however, is not necessarily limited to this. It is also possible to perform an operation by transferring connection conditions held in the terminal apparatus 200 to the printing apparatus 300. A P2P (Peer to Peer) connection parameter group 510 is necessary for establishing peer-to-peer communication (to be referred to as P2P communication hereinafter) in which the terminal apparatus 200 and the printing apparatus 300 are directly connected via the wireless LAN 102. This parameter group includes the following parameters. A P2P connectivity flag 511 indicates whether the printing apparatus 300 can currently establish a P2P connection to the terminal apparatus 200. When, for example, the printing apparatus 300 has already established a P2P connection to another apparatus or the printing apparatus 300 cannot switch to a P2P connection because processing by infrastructure mode communication with another terminal is in progress, the terminal apparatus 200 can determine based on the flag that it is impossible to establish a P2P connection. An SSID 512, a network key 513, and a mode 514 are wireless LAN connection parameters for establishing a P2P connection. Note that the P2P connection indicates direct data transmission/reception between the terminal apparatus 200 and the printing apparatus 300. The operation of the wireless LAN is not limited to, for example, the ad hoc mode. An access point mode in which one of the terminal apparatus 200 and the printing apparatus 300 serves as an access point and the other connects to the access point may be used. Alternatively, the present invention is applicable to an arrangement in which the printing apparatus 300 connected to the existing access point 103 transfers information about a connection to the access point 103 to the terminal apparatus 200, and the terminal apparatus 200 connects to the access point 103.

A cloud print parameter group 520 is necessary for the terminal apparatus 200 to issue a print job to the printing apparatus 300 via the cloud printing server 400. This parameter group includes the following parameters. A server address 521 is the address of the cloud printing server 400. A printer identifier 522 is used to specify the printing apparatus 300, and is issued when the printing apparatus 300 is registered in the cloud printing server 400. The cloud print parameter group 520 can also include a password 523 necessary for issuing a print job, and other information.

Note that the above example shows an embodiment of the present invention, and different pieces of information may be included, or some of the above parameters need not be included. For example, the cloud print parameter group 520 is transmitted/received via the NFC connection 101. However, if the cloud print parameter group 520 undergoes linking management between the terminal apparatus 200 and the printing apparatus 300 in advance, parameters saved in the terminal apparatus 200 may be used to perform connection. Also, if a standard for determining and transferring an SSID and the like according to a negotiation sequence like Wi-Fi Direct is used as a P2P connection, these parameters need not be included in the connection condition information 500 transferred via the NFC connection.

Figure 7:
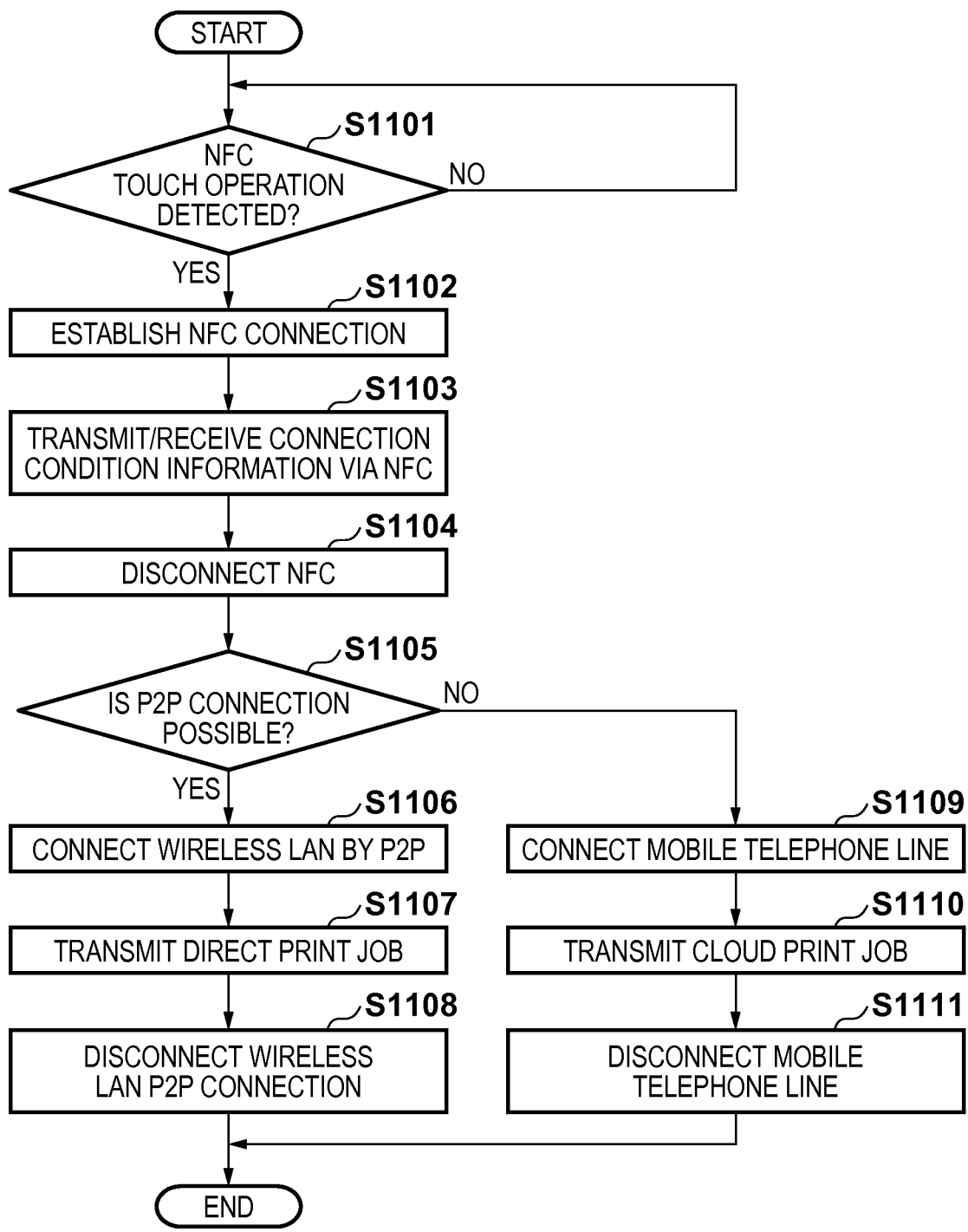
FIG. 7 is a flowchart illustrating the processing contents of the terminal apparatus when transmitting a print job to the printing apparatus.

FIG. 7 is a flowchart illustrating the processing contents of the CPU 211 of the terminal apparatus 200 when the terminal apparatus 200 transmits a print job to the printing apparatus 300. The processing is stored in the program memory 213 or the image memory 220 of the terminal apparatus 200, and executed by the CPU 211 when the user performs an operation of instructing printing in the terminal apparatus 200. The CPU 211 of the terminal apparatus 200 stands by for an NFC touch operation to be performed in step S1101. Upon detecting an NFC touch operation, the process advances to step S1102 to establish the NFC connection 101 to the printing apparatus 300. In step S1103, the CPU 211 transmits/receives connection condition information to/from the printing apparatus 300 via the NFC connection 101. In this embodiment, the terminal apparatus 200 performs processing of receiving the connection condition information from the printing apparatus 300. Upon completion of the reception processing, in step S1104 the CPU 211 disconnects the NFC connection, thereby terminating the NFC connection.

In step S1105, based on the information transmitted/received in step S1103, the CPU 211 determines whether P2P connection is possible (printing enable/disable). Note that in the processing shown in FIG. 7, the printing apparatus 300 is limited in terms of simultaneous connection to a plurality of apparatuses. If it is determined that P2P connection is possible (printing enable), the process advances to step S1106 to transit to handover connection processing with the printing apparatus 300. That is, the CPU 211 switches the wireless LAN unit 202 to a P2P connection by setting the wireless LAN unit 202 using P2P connection parameters included in the information transmitted/received in step S1103, thereby establishing a P2P connection to the printing apparatus 300. In step S1107, the CPU 211 directly transmits a print job as a direct print job to the printing apparatus 300. Upon completion of transmission of the print job, the process advances to step S1108 to disconnect the P2P connection of the wireless LAN unit 202 of the terminal apparatus 200, thereby terminating the series of processes.

On the other hand, if it is determined in step S1105 that P2P connection is impossible (or printing disable is determined at this point), the process advances to step S1109 to connect the line connecting unit 203 to the mobile telephone line network 105. Upon establishing a connection to the mobile telephone line network 105, the process advances to step S1110 to transmit a cloud print job to the predetermined cloud printing server 400 using cloud print parameters included in the information transmitted/received in step S1103. Upon completion of transmission of the print job, the process advances to step S1111 to disconnect the connection of the line connecting unit 203 of the terminal apparatus to the mobile telephone line network 105, thereby terminating the series of processes.

Figure 8:
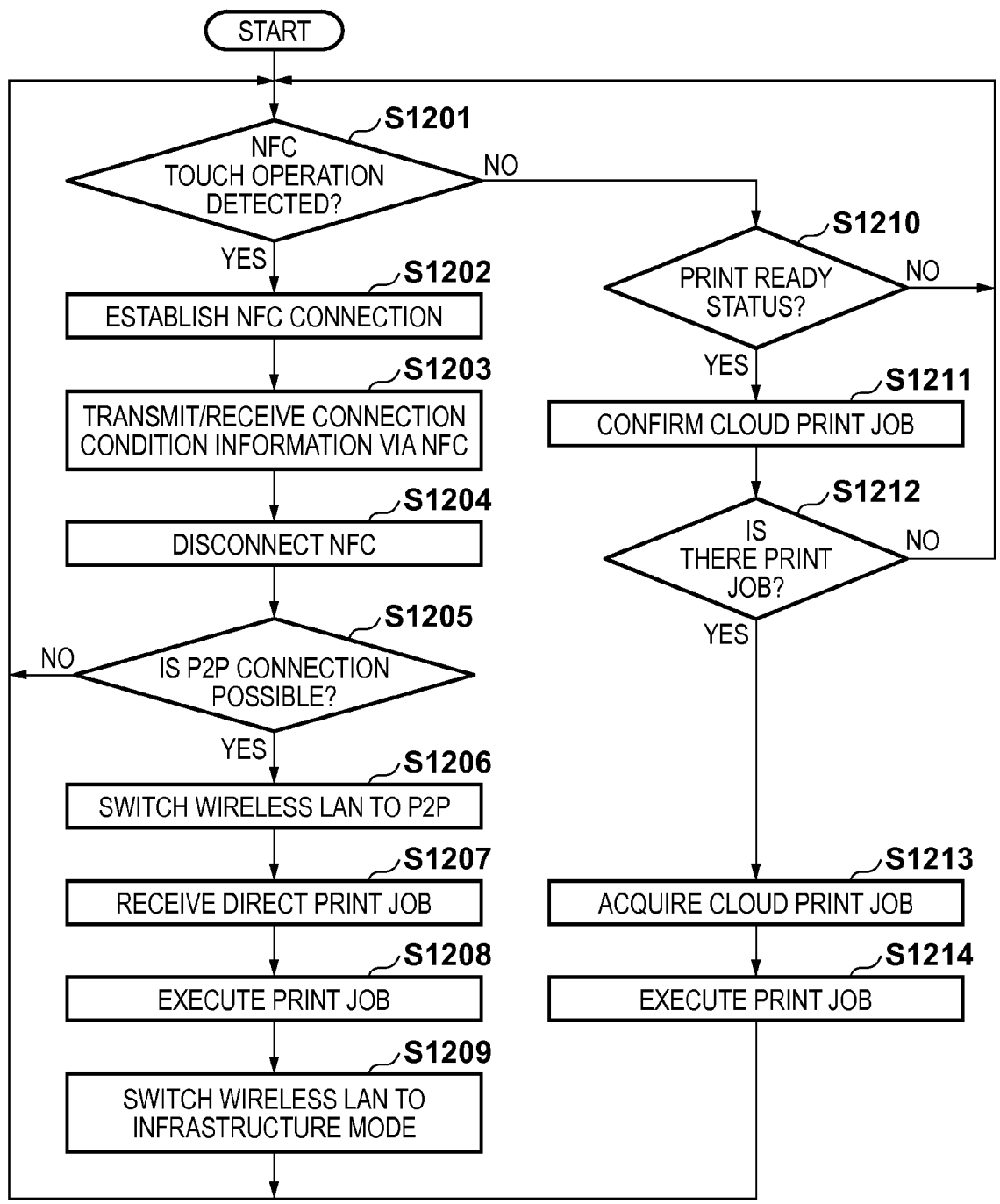
FIG. 8 is a flowchart illustrating the processing contents of the printing apparatus when receiving a print job from the terminal apparatus to execute printing.

FIG. 8 is a flowchart illustrating the processing contents of the CPU 311 of the printing apparatus 300 when the printing apparatus 300 receives a print job from the terminal apparatus 200 to execute printing. The processing is stored in the program memory 313 of the printing apparatus 300. The processing is activated upon power-on of the printing apparatus 300, and repeatedly executed during a standby state. The CPU 311 of the printing apparatus 300 stands by for an NFC touch operation to be performed in step S1201. Upon detecting an NFC touch operation, the process advances to step S1202 to establish the NFC connection 101 to the terminal apparatus 200. In step S1203, the CPU 311 transmits/receives connection condition information to/from the terminal apparatus 200 via the NFC connection 101. In this embodiment, the printing apparatus 300 supplies the connection condition information to the terminal apparatus 200. After supplying the information, the process advances to step S1204 to disconnect the NFC connection, thereby terminating the NFC connection.

In step S1205, the CPU 311 determines whether P2P connection is possible. If the CPU 311 determines that P2P connection is impossible, the process returns to the first step to repeat the processing. On the other hand, if the CPU 311 determines that P2P connection is possible, the process advances to step S1206 to establish a handover connection to the terminal apparatus 200. That is, the CPU 311 switches the wireless LAN unit 308 to a P2P connection using P2P connection parameters included in the information transmitted/received in step S1203, thereby establishing a P2P connection to the terminal apparatus 200. The CPU 311 directly receives a print job as a direct print job from the terminal apparatus 200 in step S1207, and executes printing in step S1208. At this time, the printing apparatus 300 may start a printing operation after all direct print jobs are received, or may perform a printing operation while receiving print jobs. Upon completion of execution of printing, the process advances to step S1209 to switch the wireless LAN unit 202 of the terminal apparatus 200 to the infrastructure mode, establish a connection to the access point 103, and terminate the series of processes, thereby returning to the first step to repeat the processing. In the above description, the printing apparatus 300 switches the wireless LAN unit 202 to the infrastructure mode upon completion of execution of the print job. However, in order to quickly complete the processing on the side of the terminal apparatus 200, the printing apparatus 300 may disconnect the P2P connection to switch to the infrastructure mode during execution of the print job only if reception of the direct print job is complete.

On the other hand, if no NFC touch operation is detected in step S1201, the CPU 311 advances to step S1210 to determine whether the apparatus is currently in a print request standby status (to be referred to as a print ready status hereinafter) without executing any print processing. If the CPU 311 determines that the apparatus is executing printing, the process returns to step S1201. Alternatively, if the CPU 311 determines that the apparatus is in the print ready status, the process advances to step S1211 to determine whether a print request has been received from the cloud printing server 400. If the CPU 311 determines in step S1212 that no print request has been received from the cloud printing server 400, the process returns to the first step to repeat the processing. Alternatively, if the CPU 311 determines that a print request has been received from the cloud printing server, the process advances to step S1213 to acquire a print job spooled as a cloud print job. In step S1214, the CPU 311 executes the print job. Upon completion of execution of printing, the CPU 311 terminates the series of processes, and returns to the first step to repeat the processing.

FIGS. 9A and 9B are sequence charts each showing a sequence when the terminal apparatus 200 transmits a print job and the printing apparatus 300 executes printing. FIG. 9A is a sequence chart when P2P connection is possible. When both the terminal apparatus 200 and the printing apparatus 300 detect an NFC touch operation in step S1401, the printing apparatus 300 transfers the connection condition information 500 to the terminal apparatus 200 via the NFC connection in step S1402. In this case, since P2P connection is possible, the printing apparatus 300 switches the wireless LAN to a P2P connection in step S1403. In step S1404 simultaneously executed, the terminal apparatus 200 establishes a P2P connection using the P2P connection parameter group 510 included in the connection condition information 500 transferred in step S1402. This establishes a handover connection, that is, a P2P connection between the terminal apparatus 200 and the printing apparatus 300. In step S1405, the terminal apparatus 200 transmits a direct print job to the printing apparatus 300. The printing apparatus 300 executes the transmitted print job in step S1406. Upon completion of execution of the print job, the terminal apparatus 200 disconnects the P2P connection in step S1407, and the printing apparatus 300 switches the wireless LAN from the P2P mode to the infrastructure mode in step S1408, thereby terminating the sequence.

On the other hand, FIG. 9B is a sequence chart when P2P connection is impossible. When both the terminal apparatus 200 and the printing apparatus 300 detect an NFC touch operation in step S1401, the printing apparatus 300 transfers the connection condition information 500 to the terminal apparatus 200 via the NFC connection in step S1402. In this case, since P2P connection is impossible, the terminal apparatus 200 connects to the mobile telephone line in step S1409. The terminal apparatus 200 issues a cloud print job to the cloud printing server 400 using the cloud print parameter group 520 included in the connection condition information 500 transferred in step S1410. In step S1411, the cloud printing server 400 spools the issued cloud print job. Upon completion of transmission of the cloud print job, the terminal apparatus 200 disconnects the connection to the mobile telephone line in step S1412. On the other hand, when the cloud printing server 400 spools the print job, it transmits a print job notification to the printing apparatus 300 (step S1413). When the printing apparatus 300 enters a print job executable status (the print ready status), the process advances to step S1414 to acquire the cloud print job spooled in the cloud printing server 400. In step S1415, the printing apparatus 300 executes printing of the acquired print job.

With the above-described control processing, even if it is impossible to establish a P2P connection by a handover caused by an NFC touch operation, the terminal apparatus 200 can immediately execute print job transmission to the printing apparatus 300. Even if the printing apparatus 300 cannot immediately execute a direct print job via a P2P connection, it need not save the direct print job in itself. Since the cloud print job is sent via the cloud printing server 400 later, the printing apparatus 300 need only execute printing after receiving the print job.

Note that a case in which the terminal apparatus 200 issues a print job to the cloud printing server 400 via the mobile telephone line network 105 has been described in this embodiment. However, if the terminal apparatus 200 can be connected to the access point 103, it may issue a print job via the access point 103. That is, any unit other than a short distance wireless communication unit may be used as long as it is possible to communicate with the cloud printing server 400. In this case, the cloud printing server 400 is not limited to a remote server accessed via the Internet 104, and may be a server arranged within a local area. Furthermore, in this embodiment, a case in which image data saved in the terminal apparatus 200 is printed has been exemplified. A target to be printed is not limited to image data, and original data and drawing data may be printed. In addition to data saved in the terminal apparatus 200, data saved in another apparatus and various contents provided on the Internet 104 may be printed.

In the above embodiment, upon receiving a print job from the terminal apparatus 200, the cloud printing server 400 issues a print job notification (print job reception request) to the printing apparatus 300. In response to this, the printing apparatus 300 acquires the print job from the cloud printing server 400. However, the printing apparatus 300 may poll the cloud printing server 400 to inquire about the presence/absence of a print job destined for the self apparatus. When the printing apparatus 300 can confirm the presence of a print job, it may acquire the print job.

Second Embodiment

In the aforementioned first embodiment, a case has been explained in which whether P2P connection is possible is determined based on the P2P connectivity flag 511 transferred via the NFC connection 101, and a print job transmission method is then decided based on the determination result. In addition, in the second embodiment, a case will be described in which after establishing a P2P connection, the status of a printing apparatus 300 is acquired to change a print job transmission method. Note that the configuration of a printing system 100, the arrangement of each apparatus, and the structure of connection condition information 500 according to the second embodiment are the same as those in the first embodiment, unless otherwise specified, and a description thereof will be omitted.

Figure 10:
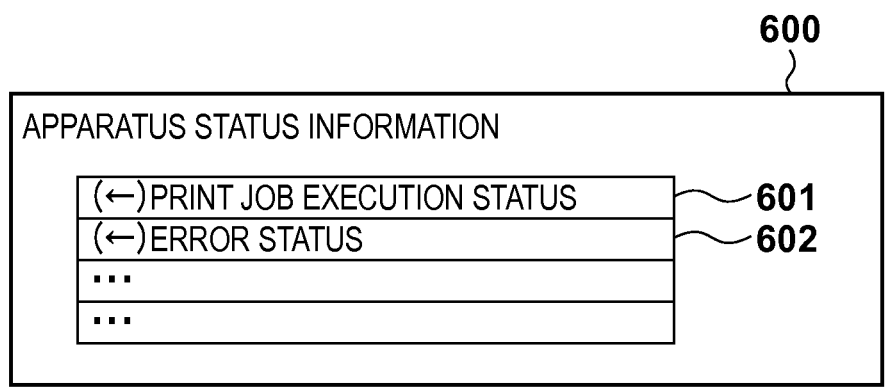
FIG. 10 is a view showing contents of apparatus status information transferred from a printing apparatus to a terminal apparatus according to the second embodiment.

FIG. 10 is a view showing contents of apparatus status information 600 transferred from the printing apparatus 300 to a terminal apparatus 200 according to the second embodiment. A print job execution status 601 indicates whether the printing apparatus 300 is executing some print job. An error status 602 indicates whether the printing apparatus 300 currently stops due to some error. By referring to these flags, the terminal apparatus 200 can determine whether it can immediately transmit a direct print job to the printing apparatus 300.

Figure 11:
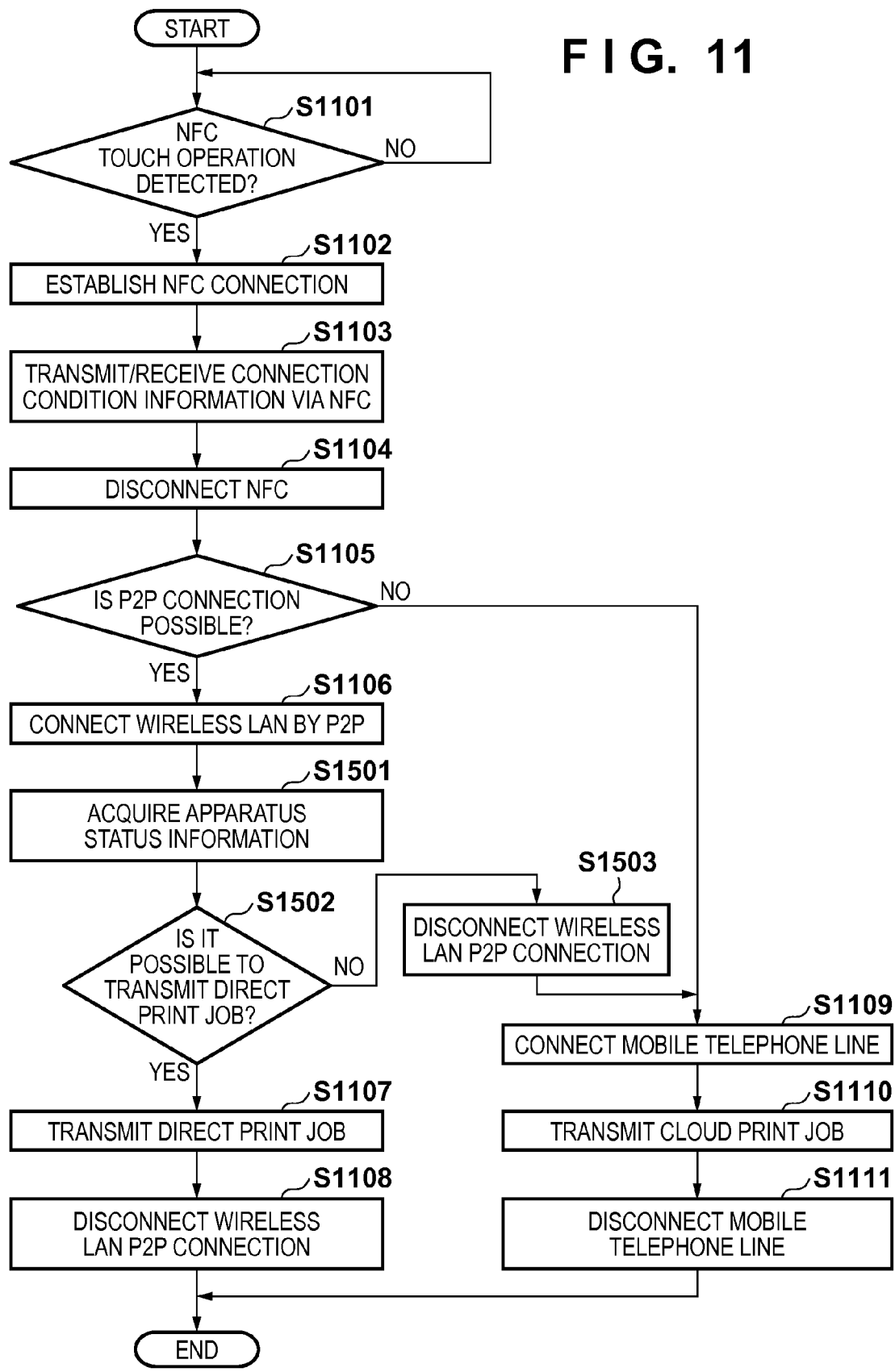
FIG. 11 is a flowchart illustrating the processing contents of the terminal apparatus when transmitting a print job to the printing apparatus.

FIG. 11 is a flowchart illustrating the processing contents of a CPU 211 of the terminal apparatus 200 when the terminal apparatus 200 transmits a print job to the printing apparatus 300. Note that processes in steps S1101 to S1105 of FIG. 11 are the same as those denoted by the same reference symbols of FIG. 7 in the aforementioned first embodiment and a description thereof will be omitted. Note also that in the processing shown in FIG. 11, the printing apparatus 300 is allowed to be simultaneously connected to a plurality of apparatuses. Therefore, even while an apparatus other than the terminal apparatus 200 makes the printing apparatus 300 execute printing via a P2P connection, the terminal apparatus 200 can establish a P2P connection to the printing apparatus 300.

If the CPU 211 of the terminal apparatus 200 determines in step S1105 that P2P connection is possible, the process advances to step S1106 to establish a handover connection to the printing apparatus 300. That is, the CPU 211 switches a wireless LAN unit 202 to a P2P connection using P2P connection parameters included in information transmitted/received in step S1103, thereby establishing a P2P connection to the printing apparatus 300. In step S1501, the CPU 211 requests apparatus status information of the printing apparatus 300, and acquires the apparatus status information 600 as a response to the request. In step S1502, based on the acquired apparatus status information 600, the CPU 211 determines whether it is possible to transmit a direct print job to the printing apparatus 300. In this example, when the print job execution status 601 indicates that no job is in progress and the error status 602 indicates that the printing apparatus 300 is not in the error status, the CPU 211 determines that it is possible to transmit a direct print job. If the CPU 211 determines that it is possible to transmit a direct print job, the process advances to step S1107 to transmit a direct print job to the printing apparatus 300. Upon completion of transmission of the print job, the process advances to step S1108 to disconnect the P2P connection of the wireless LAN unit 202 of the terminal apparatus 200, thereby terminating the series of processes.

On the other hand, if the CPU 211 determines in step S1502 that it is impossible to transmit a print job, the process advances to step S1503 to disconnect the P2P connection of the wireless LAN unit 202 of the terminal apparatus 200. After that, the process advances to step S1109 to execute cloud print job transmission processes. The cloud print job transmission processes from a mobile telephone line network 105 in steps S1109 to S1111 are the same as those denoted by the same reference symbols of FIG. 7 in the aforementioned first embodiment and a description thereof will be omitted.

Figure 12:
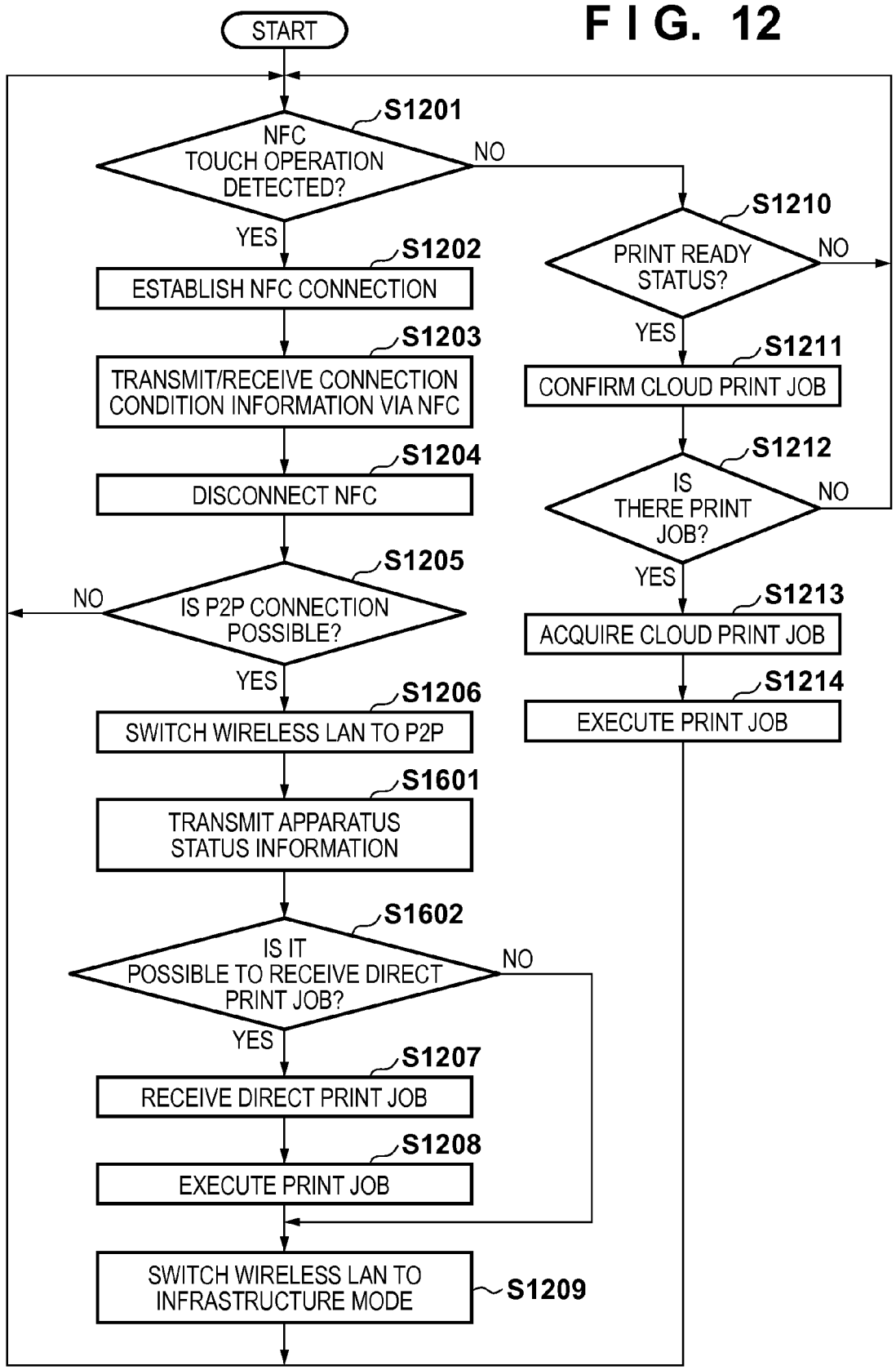
FIG. 12 is a flowchart illustrating the processing contents of the printing apparatus when receiving a print job from the terminal apparatus to execute printing.

FIG. 12 is a flowchart illustrating the processing contents of a CPU 311 of the printing apparatus 300 when the printing apparatus 300 receives a print job from the terminal apparatus 200 to execute printing. Note that processes in steps S1201 to S1205 of FIG. 12 are the same as those denoted by the same reference symbols of FIG. 8 in the above embodiment and a description thereof will be omitted. If the CPU 311 determines in step S1205 that P2P connection is possible, the process advances to step S1206 to establish a handover connection to the terminal apparatus 200. That is, the CPU 311 switches a wireless LAN unit 308 to a P2P connection using P2P connection parameters included in information transmitted/received in step S1203, thereby establishing a P2P connection to the terminal apparatus 200. In step S1601, in response to a request from the terminal apparatus 200, the CPU 311 transmits the apparatus status information 600 to the terminal apparatus 200. In step S1602, the CPU 311 determines whether it is possible to receive a direct print job from the terminal apparatus 200, and execute the direct print job. In this example, when the print job execution status 601 indicates that no job is in progress and the error status 602 indicates that the printing apparatus 300 is not in the error status, the CPU 311 determines that it is possible to receive a direct print job. If the CPU 311 determines that it is possible to receive a direct print job, the process advances to step S1207 to directly receive a print job as a direct print job from the terminal apparatus 200. In step S1208, the CPU 311 executes printing. Upon completion of execution of printing, the process advances to step S1209 to switch the wireless LAN unit 202 of the terminal apparatus 200 to the infrastructure mode, establishes a connection to the access point 103, and terminate the series of processes, thereby returning to the first step to repeat the processing. On the other hand, if the CPU 311 determines in step S1602 that it is impossible to receive a direct print job, the process directly advances to step S1209 to switch the wireless LAN unit 202 of the terminal apparatus 200 to the infrastructure mode, thereby returning to the first step to repeat the processing.

FIGS. 13A and 13B are sequence charts each showing a sequence when the terminal apparatus 200 transmits a print job and the printing apparatus 300 executes printing. FIG. 13A is a sequence chart when it is possible to execute a direct print job. Note that processes in steps S1401 to S1403 of FIG. 13A are the same as those denoted by the same reference symbols of FIG. 9 in the aforementioned first embodiment and a description thereof will be omitted. In steps S1401 to step S1403, a handover connection, that is, a P2P connection between the terminal apparatus 200 and the printing apparatus 300 is established. Upon establishing a P2P connection, the terminal apparatus 200 requests apparatus status information of the printing apparatus 300 in step S1701. In response to this, the printing apparatus 300 transmits the apparatus status information 600 to the terminal apparatus 200 in step S1702. In this case, since it is possible to transmit a direct print job, the printing apparatus 300 transmits a direct print job to the terminal apparatus 200 in step S1405. In step S1406, the printing apparatus 300 executes the transmitted print job. Upon completion of execution of the print job, the terminal apparatus 200 disconnects the P2P connection in step S1407, and the printing apparatus 300 switches the wireless LAN from the P2P mode to the infrastructure mode in step S1408, thereby terminating the sequence.

On the other hand, FIG. 13B is a sequence chart when it is impossible to execute a direct print job. Processes in steps S1401 to S1403, S1701, and S1702 are the same as those shown in FIG. 13A. In this case, since it is impossible to receive a direct print job via the P2P connection, the terminal apparatus 200 disconnects the P2P connection in step S1407, and the printing apparatus 300 switches the wireless LAN from the P2P mode to the infrastructure mode in step S1408. After that, processes of executing a print job as a cloud print job in steps S1409 to S1415 are the same as those denoted by the same reference symbols of FIGS. 9A and 9B and a description thereof will be omitted.

With the above-described control processing, even if the printing apparatus 300 is executing a print job or the printing apparatus 300 cannot execute a direct print job since it stops due to an error, the terminal apparatus 200 can immediately execute print job transmission to the printing apparatus 300.

Third Embodiment

In the third embodiment, a case will be described in which charging processing is performed after a terminal apparatus 200 transfers information about charging for a print job to a printing apparatus 300 via an NFC connection 101, and the printing apparatus 300 executes printing. The information about charging includes a credit card number and charging service account information registered in advance. The printing apparatus 300 performs charging processing by accessing a necessary charging service based on the pieces of information received from the terminal apparatus 200. In this example, a known technique is used to perform the charging processing and a detailed description thereof will be omitted. In the arrangement described in the first or second embodiment, when the terminal apparatus 200 transmits a print job, if P2P connection is impossible or it is impossible to execute a direct print job, the terminal apparatus 200 transmits a print job to the external cloud printing server 400. At this time, it is necessary to transmit charging information in association with the print job so as to be transmitted to the printing apparatus 300. However, transmitting charging information via the external cloud printing server 400 poses the risk of leaking the charging information. To avoid the risk, in the third embodiment, the terminal apparatus 200 transfers charging information to the printing apparatus 300 at the time of establishing the NFC connection 101. Note that the configuration of a printing system 100, the arrangement of each apparatus, and the like according to this embodiment are the same as those described in the first embodiment, unless otherwise specified, and a description thereof will be omitted.

Figure 14:
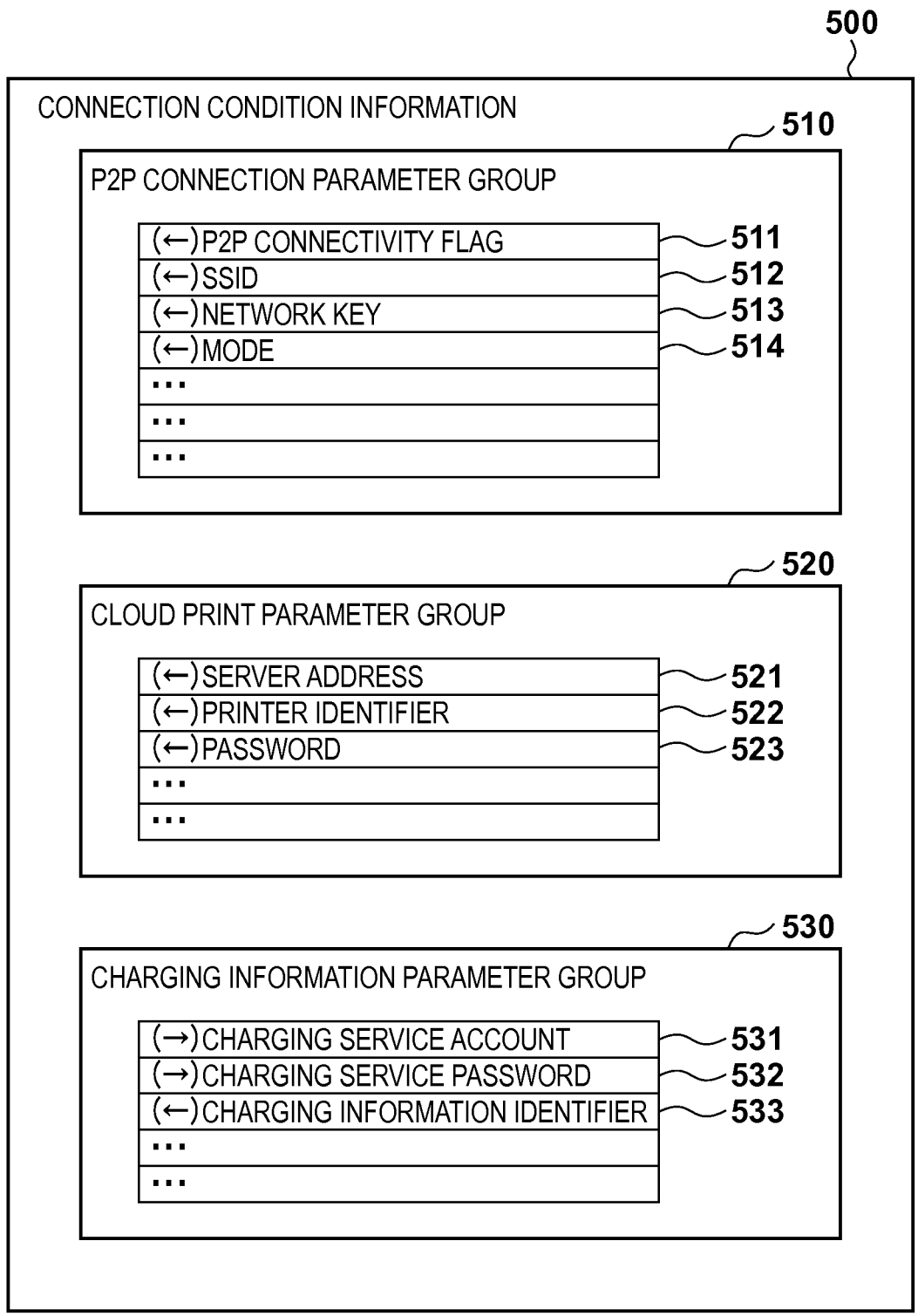
FIG. 14 is a view showing contents of connection condition information transmitted/received between a printing apparatus and a terminal apparatus via an NFC connection.

FIG. 14 is a view showing contents of connection condition information 500 transmitted/received between the printing apparatus 300 and the terminal apparatus 200 via the NFC connection 101. A P2P connection parameter group 510 and a cloud print parameter group 520 are the same as those denoted by the same reference numerals of FIG. 6 in the aforementioned first embodiment and a description thereof will be omitted. A charging information parameter group 530 is necessary for the printing apparatus 300 to process charging for a print job. This parameter group includes the following parameters. A charging service account 531 and a charging service password 532 respectively indicate the account and password of a charging service, which are registered in advance by the user. These parameters are transmitted from the terminal apparatus 200 to the printing apparatus 300 at the time of establishing the NFC connection 101, temporarily stored in the printing apparatus 300, and used for charging processing after execution of a print job. The printing apparatus 300 can store a plurality of charging information parameter groups 530 in itself so as to perform processing even if a plurality of terminal apparatuses 200 simultaneously establish NFC connections 101. A charging information identifier 533 is an identifier for uniquely associating a print job with charging information when a plurality of terminals simultaneously transmit print jobs. Upon receiving the charging service account 531 and the charging service password 532 via the NFC connection 101, the printing apparatus 300 uniquely decides the charging information identifier 533, and notifies the terminal apparatus 200 of it via the NFC connection 101.

Figure 15:
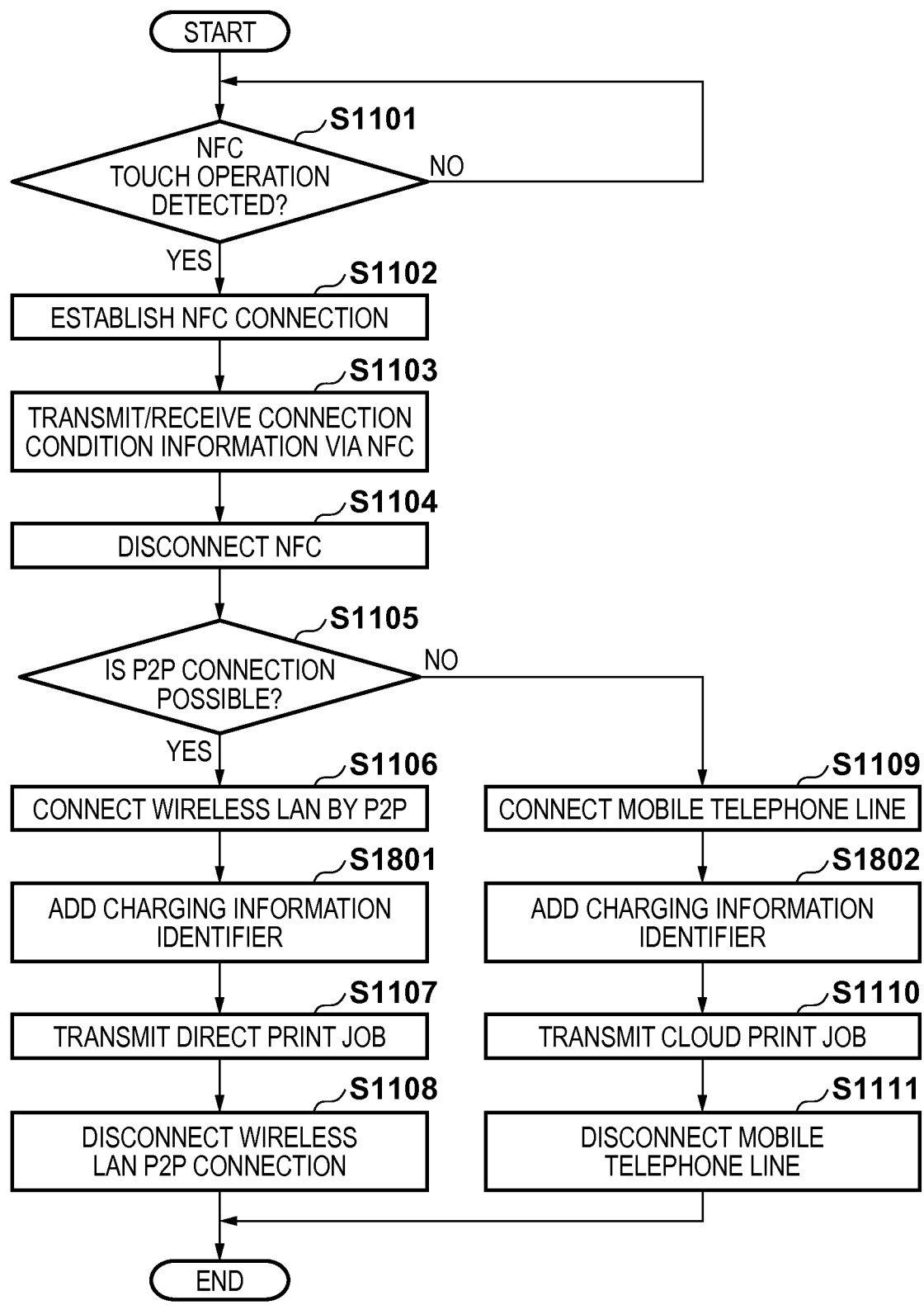
FIG. 15 is a flowchart illustrating the processing contents of the terminal apparatus when transmitting a print job to the printing apparatus.

FIG. 15 is a flowchart illustrating the processing contents of a CPU 211 of the terminal apparatus 200 when the terminal apparatus 200 transmits a print job to the printing apparatus 300. Note that processes in steps S1101 to S1111 of FIG. 15 are the same as those denoted by the same reference symbols of FIG. 7 in the aforementioned first embodiment and a description thereof will be omitted. In this embodiment, the terminal apparatus 200 adds the charging information identifier 533 to a print job in step S1801 before direct print job transmission, and transmits the print job as a direct print job in step S1107. Similarly, the terminal apparatus 200 adds the charging information identifier 533 to a print job in step S1802 before cloud print job transmission, and transmits the print job as a cloud print job in step S1110.

Figure 16:
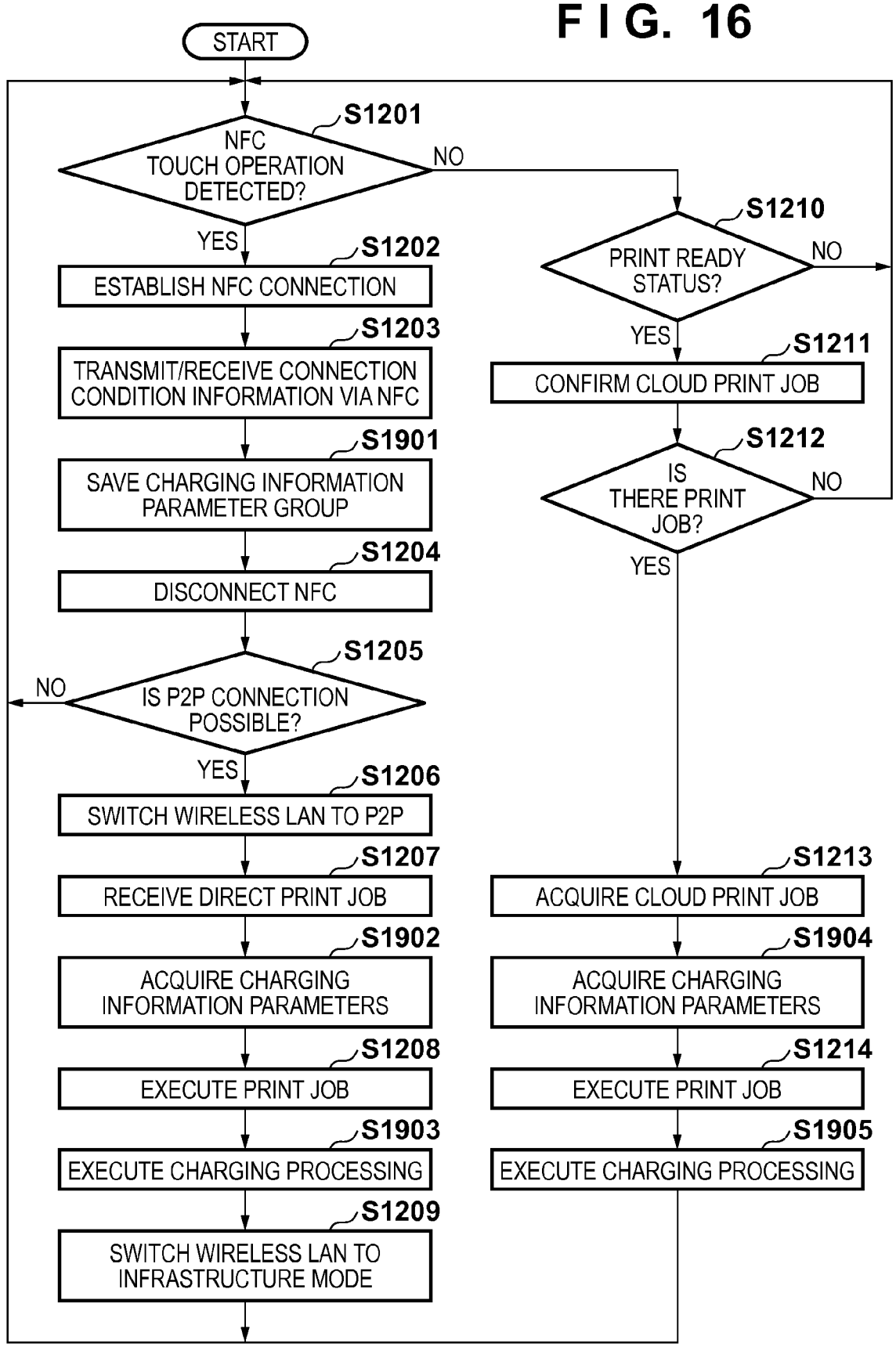
FIG. 16 is a flowchart illustrating the processing contents of the printing apparatus when receiving a print job from the terminal apparatus to execute printing.

FIG. 16 is a flowchart illustrating the processing contents of a CPU 311 of the printing apparatus 300 when the printing apparatus 300 receives a print job from the terminal apparatus 200 to execute printing. Note that processes in steps S1201 to S1213 of FIG. 16 are the same as those denoted by the same reference symbols of FIG. 8 in the aforementioned first embodiment and a description thereof will be omitted. The CPU 311 of the printing apparatus 300 acquires the charging information parameter group 530 from the connection condition information 500 transmitted/received via the NFC connection 101 in step S1203, and saves the charging information parameter group 530 in a predetermined area of a data memory 314 in step S1901. Upon receiving a direct print job in step S1207, in step S1902 the CPU 311 collates the charging information identifier 533 added to the print job and that in the data memory 314, thereby acquiring charging information parameters for charging. Upon completion of execution of the print job in step S1208, the process advances to step S1903 to execute charging processing using the acquired charging service account 531 and charging service password 532.

Similarly, upon acquiring a direct print job in step S1213, in step S1904 the CPU 311 collates the charging information identifier 533 added to the print job and that in the data memory 314, thereby acquiring charging information parameters for charging. Upon completion of execution of the print job in step S1214, the process advances to step S1905 to execute charging processing using the acquired charging service account 531 and charging service password 532.

FIGS. 17A and 17B are sequence charts each showing a sequence when the terminal apparatus 200 transmits a print job and the printing apparatus 300 executes printing. Note that processes in steps S1401 to S1415 of FIGS. 17A and 17B are the same as those denoted by the same reference symbols of FIGS. 9A and 9B in the aforementioned first embodiment. FIG. 17A is a sequence chart when P2P connection is possible. When the connection condition information 500 is transmitted/received in step S1402, the printing apparatus 300 acquires the charging information parameter group 530 from the connection condition information 500, and saves the charging information parameter group 530 in the data memory 314 in step S2001. In step S2002, the terminal apparatus 200 adds the charging information identifier 533 to a direct print job, and transmits the direct print job to the printing apparatus 300. In step S2003, the printing apparatus 300 collates the charging information identifier 533 added to the received direct print job and that in the data memory 314, thereby acquiring charging information parameters. After executing the print job in step S1406, the printing apparatus 300 executes charging processing using the acquired charging information parameters in step S2004.

FIG. 17B is a sequence chart when P2P connection is impossible. When the connection condition information 500 is transmitted/received in step S1402, the printing apparatus 300 acquires the charging information parameter group 530 from the connection condition information 500, and saves the charging information parameter group 530 in the data memory 314 in step S2001, similarly to FIG. 17A. In step S2005, the terminal apparatus 200 adds the charging information identifier 533 to a cloud print job, and transmits the cloud print job to a cloud printing server 400. The cloud printing server 400 spools the issued cloud print job together with the charging information identifier 533 in step S1411. When the cloud printing server 400 spools the print job, it transmits a print job notification to the printing apparatus 300 together with the charging information identifier 533 (step S2006). When the printing apparatus 300 enters a print job executable status, the process advances to step S2007, and the printing apparatus 300 collates the charging information identifier 533 added to the print job notification and that in the data memory 314, thereby acquiring charging information parameters. After executing the print job in step S1415, the printing apparatus 300 executes charging processing using the acquired charging information parameters in step S2008.

With the above-described control processing, when executing a print job accompanied by charging processing, the terminal apparatus 200 can transmit charging information itself to the printing apparatus 300 without transmitting it to the external cloud printing server 400.

Fourth Embodiment

In the fourth embodiment, a case will be described in which when it is impossible to transmit a print job via a P2P connection of an NFC connection 101, the print job is transferred via a data storage device (file server) instead of the cloud printing server 400.

FIG. 18 is a view showing the configuration of a printing system 100 according to the fourth embodiment. The difference from FIG. 1 of the first embodiment is that a data storage device 401 is connected to a wireless LAN 102. The data storage device 401 can be accessed from a terminal apparatus 200 and a printing apparatus 300 as a shared folder. Note that FIG. 18 shows a mode in which the data storage device 401 is connected to the same wireless LAN 102 as that connected to the terminal apparatus 200 and the printing apparatus 300. The present invention, however, is not limited to this. The data storage device 401 may be connected to a different network via an access point 103, or connected via the Internet 104.

FIG. 19 is a view showing contents of connection condition information 500 transmitted/received between the printing apparatus 300 and the terminal apparatus 200 via the NFC connection 101. A P2P connection parameter group 510 is the same as that denoted by the same reference numeral of FIG. 6 in the aforementioned first embodiment and a description thereof will be omitted. A print job parameter group 540 is necessary for transferring a print job via the data storage device 401. This parameter group includes the following parameters. A print job save address 541 is saved by the terminal apparatus 200, and used to uniquely specify the save destination address of a print job to be read out by the printing apparatus 300. This parameter is information to be transferred from the terminal apparatus 200 to the printing apparatus 300 by an NFC touch operation.

Figure 20:
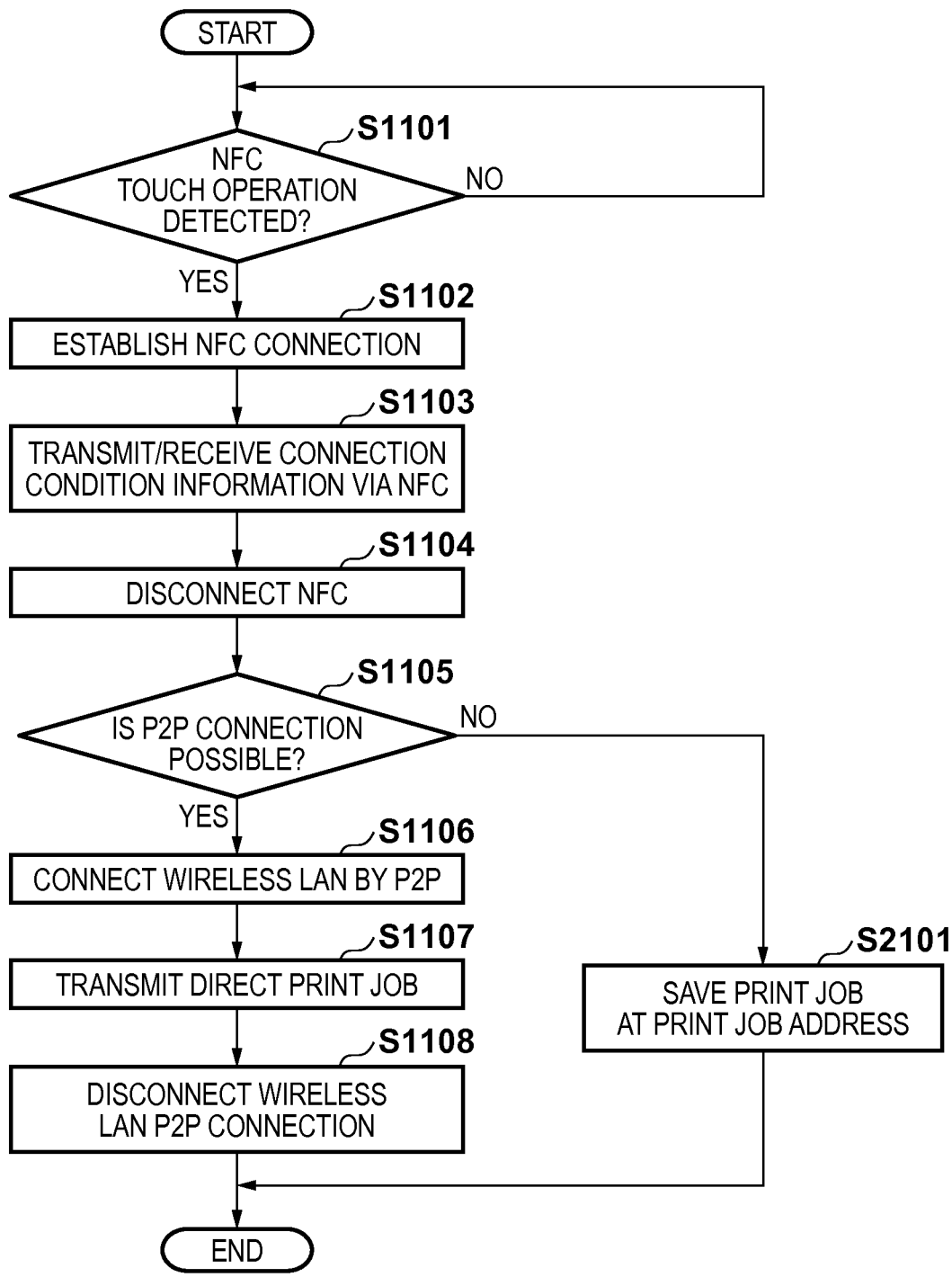
FIG. 20 is a flowchart illustrating the processing contents of the terminal apparatus.

FIG. 20 is a flowchart illustrating the processing contents of a CPU 211 of the terminal apparatus 200 when the terminal apparatus 200 transmits a print job to the printing apparatus 300. Note that processes in steps S1101 to S1108 of FIG. 20 are the same as those denoted by the same reference symbols of FIG. 7 in the aforementioned first embodiment and a description thereof will be omitted. If the CPU 211 determines in step S1105 that P2P connection is impossible, it advances to step S2101 to save print job data in a location indicated by the print job save address 541 transmitted in step S1103, thereby terminating the series of processes.

Figure 21:
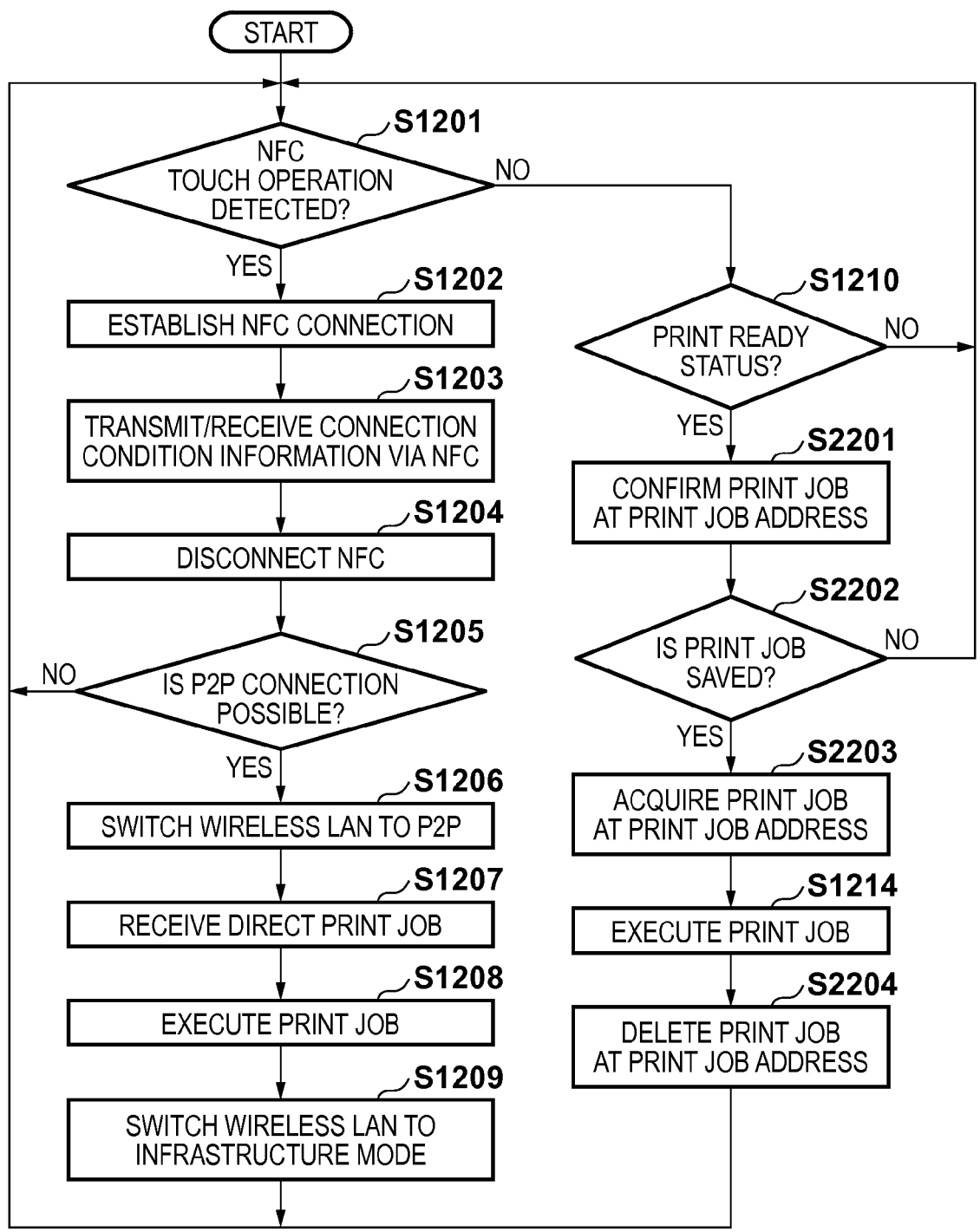
FIG. 21 is a flowchart illustrating the processing contents of the printing apparatus when receiving a print job from the terminal apparatus to execute printing.

FIG. 21 is a flowchart illustrating the processing contents of a CPU 311 of the printing apparatus 300 when the printing apparatus 300 receives a print job from the terminal apparatus 200 to execute printing. Note that processes in steps S1201 to S1209 of FIG. 21 are the same as those denoted by the same reference symbols of FIG. 8 in the aforementioned first embodiment and a description thereof will be omitted. If no NFC touch operation is detected in step S1201, the CPU 311 advances to step S1210 to determine whether the self apparatus is in the print ready status. If the apparatus is in the print ready status, the CPU 311 advances to step S2201 to acquire the print job save address 541 received in step S1203. In step S2202, the CPU 311 confirms whether a print job is saved in the location indicated by the print job save address 541. If no print job is saved, the CPU 311 stands by for a print job to be saved. If the CPU 311 determines in step S2202 that a print job is saved, the process advances to step S2203 to acquire the print job saved at the print job save address 541. After executing the print job in step S1214, the CPU 311 deletes the print job data from the location indicated by the print job save address 541 in step S2204.

FIGS. 22A and 22B are sequence charts each showing a sequence when the terminal apparatus 200 transmits a print job and the printing apparatus 300 executes printing. FIG. 22A is a sequence chart when P2P connection is possible. Note that processes in steps S1401 to S1408 of FIG. 22A are the same as those denoted by the same reference symbols of FIGS. 9A and 9B in the aforementioned first embodiment and a description thereof will be omitted.

On the other hand, FIG. 22B is a sequence chart when P2P connection is impossible. Processes in steps S1401 and S1402 are the same as those in FIG. 22A. In this case, since P2P connection is impossible, the terminal apparatus 200 saves the print job in the location indicated by the print job save address 541 in step S2301. In this example, the print job save address 541 points at a location in the data save area of the data storage device 401, where the print job is saved in step S2302. Note that a case in which the print job save address 541 points at a location in the data save area of the data storage device 401 has been explained. However, the save location may be in the save area of the nonvolatile memory or the like of the terminal apparatus 200. When the printing apparatus 300 enters the print ready status, it confirms in step S2303*a* whether print job data is saved in the location indicated by the already received print job save address 541. If the printing apparatus 300 confirms that print job data is saved, it acquires a print job in step S2303*b*, and executes the print job in step S2304. After executing the print job, the printing apparatus 300 transmits a print job data delete request to the data storage device 401 in step S2305, and deletes the print job data from the data storage device 401.

With the above-described control processing, even if there is no cloud printing server 400, it is possible to obtain the same effects as those in the aforementioned first embodiment by arranging the data storage device 401.

The processing described in the above embodiment may be applied to a terminal apparatus or printing apparatus incorporating communication units such as a wireless LAN unit and NFC unit. Alternatively, the processing may be applied to a terminal apparatus or printing apparatus which controls communication units connected as external devices.

Although the printing apparatus has been exemplified in the above example, the present invention is not limited to this. Various apparatuses such as a reading apparatus for reading an original may be used. A job transmitted by a terminal apparatus may be, for example, an original reading job.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137479, filed Jun. 28, 2013, which is hereby incorporated by reference herein in its entirety.

What is claimed is:

1. An information processing apparatus for performing communication using each of a first communication method in which short distance wireless communication is executed and a second communication method, comprising:
at least one processor; and
at least one memory configured to store a program which can be executed by the at least one processor,
wherein the at least one processor acquires by the first communication method in response to connection with a device by the first communication method, both of first information relating to communication by the second communication method with the device and second information for specifying a destination of transmission of predetermined data
wherein, after both of the first information and the second information are acquired by the first communication method, the at least one processor determines whether it is possible to transfer the predetermined data to the device without using the second information;
and wherein in a case where it is determined that it is possible to transfer the predetermined data to the device without using the second information, the at least one processor transmits the predetermined data to the device by the second communication method using the first information and without using the second information,
and wherein in a case where it is determined that it is not possible to transfer the predetermined data to the device without using the second information, the at least one processor transmits the predetermined data to the destination from which the device can acquire the predetermined data, by the second communication method using the second information.

2. The apparatus according to claim 1, wherein said the at least one processer determines whether it is possible to transfer the predetermined data to the device without using the second information based on the first information received from the device by the first communication method.

3. The apparatus according to claim 1, wherein the predetermined data is a job for causing the device to execute predetermined processing.

4. The apparatus according to claim 3 wherein the at least one processor further transmits information about charging for the job to the device by the first communication method.

5. The apparatus according to claim 3, wherein the predetermined processing is print processing, and the job is a print job.

6. The apparatus according to claim 1, wherein the first communication method is NFC.

7. The apparatus according to claim 1, wherein the second communication method is a wireless LAN.

8. The apparatus according to claim 7, wherein the first information includes a SSID for communication with the device via the wireless LAN.

9. The apparatus according to claim 1, wherein the second information includes an address of the destination.

10. The apparatus according to claim 1, wherein the second information includes a password for access to the destination.

11. The apparatus according to claim 1, wherein the destination is an external server.

12. The apparatus according to claim 1, wherein the apparatus is a smart phone.

13. A control method for performing communication using each of a first communication method in which short distance wireless communication is executed and a second communication method, comprising:
acquiring by the first communication method in response to connection with a device by the first communication method, both of first information for communication by the second communication method with the device and second information for specifying a destination of transmission of predetermined data;
determining, after both of the first information and the second information are acquired by the first communication method, whether it is possible to transfer the predetermined data to the device without using the second information; and
in a case where it is determined in the determination step that it is possible to transfer the predetermined data to the device without using the second information, transmitting the predetermined data to the device by the second communication method using the first information and without using the second information, and in a case where it is determined in the determination step that it is not possible to transfer the predetermined data to the device without using the second information, transmitting the predetermined data to the destination from which the device can acquire the predetermined data, by the second communication method using the second information.

14. The method according to claim 13, wherein the determining determines whether it is possible to transfer the predetermined data to the device without using the second information based on the first information received from the device by the first communication method.

15. The method according to claim 13, wherein the predetermined data is a job for causing the device to execute predetermined processing.

16. The method according to claim 15,
further comprising transmitting information about charging for the job to the device by the first communication method.

17. The method according to claim 15, wherein the predetermined processing is print processing, and the job is a print job.

18. The method according to claim 13, wherein the first communication method is NFC.

19. The method according to claim 13, wherein the second communication method is a wireless LAN.

20. The method according to claim 19, wherein the first information includes a SSID for communication with the device via the wireless LAN.

21. The method according to claim 13, wherein the second information includes an address of the destination.

22. The method according to claim 13, wherein the second information includes a password for access to the destination.

23. The method according to claim 13, wherein the destination is an external server.

24. The method according to claim 13, wherein the method is performed by a smart phone.

25. A non-transitory computer-readable storage medium storing a program for, when loaded to a computer and executed by the computer, causing the computer to execute each step of a control method for performing communication using each of a first communication method in which short distance wireless communication is executed and a second communication method comprising:

an acquisition step of acquiring by the first communication method in response to connection with a device by the first communication method, both of first information for communication by the second communication method with the device and second information for specifying a destination of transmission of predetermined data;

a determination step of determining, after both of the first information and the second information are acquired by the first communication method, whether it is possible to transfer the predetermined data to the device without using the second information; and a transmission step of, in a case where it is determined in the determination step that it is possible to transfer the predetermined data to the device without using the second information, transmitting the predetermined data to the device by the second communication method using the first information and without using the second information, and in a case where it is determined in the determination step that it is not possible to transfer the predetermined data to the device without using the second information, transmitting the predetermined data to the destination from which the device can acquire the predetermined data, by the second communication method using the second information.

\* \* \* \* \*